(12) United States Patent
Sato et al.

(10) Patent No.: US 8,400,792 B2
(45) Date of Patent: Mar. 19, 2013

(54) POWER CONVERSION APPARATUS

(75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 253 days.

(21) Appl. No.: 13/057,102

(22) PCT Filed: Aug. 22, 2008

(86) PCT No.: PCT/JP2008/064966
§ 371 (c)(1),
(2), (4) Date: Feb. 1, 2011

(87) PCT Pub. No.: WO2010/021052
PCT Pub. Date: Feb. 25, 2010

(65) Prior Publication Data
US 2011/0134672 A1    Jun. 9, 2011

(51) Int. Cl.
*H02M 1/12* (2006.01)
*H02J 3/01* (2006.01)
(52) U.S. Cl. .............. 363/39; 363/40; 363/41; 363/127; 363/131; 363/132; 363/135; 363/136; 363/137
(58) Field of Classification Search ............... 363/39, 363/40, 41, 127, 131, 132, 135, 136, 137
See application file for complete search history.

(56) References Cited

U.S. PATENT DOCUMENTS

| | | | | |
|---|---|---|---|---|
| 5,831,842 A | * | 11/1998 | Ogasawara et al. | 363/40 |
| 5,852,558 A | * | 12/1998 | Julian et al. | 363/132 |
| 5,999,423 A | * | 12/1999 | Steinke et al. | 363/40 |
| 6,028,405 A | * | 2/2000 | Kume et al. | 318/400.24 |
| 6,122,184 A | * | 9/2000 | Enjeti et al. | 363/47 |
| 6,154,378 A | * | 11/2000 | Peterson et al. | 363/37 |
| 6,208,098 B1 | * | 3/2001 | Kume et al. | 318/400.25 |
| 6,377,479 B1 | * | 4/2002 | Ayano et al. | 363/40 |

(Continued)

FOREIGN PATENT DOCUMENTS

| | | |
|---|---|---|
| JP | 9 294381 | 11/1997 |
| JP | 2003 199354 | 7/2003 |

(Continued)

OTHER PUBLICATIONS

U.S. Appl. No. 13/055,373, filed Jan. 21, 2011, Sato, et al.

(Continued)

*Primary Examiner* — Bao Q Vu
(74) *Attorney, Agent, or Firm* — Oblon, Spivak, McClelland, Maier & Neustadt, L.L.P.

(57) ABSTRACT

A power conversion apparatus includes an inverter for converting DC power to AC power for supply to a load, a converter for converting AC power from an AC power supply to DC power for supply to the inverter, and a DC voltage converter for converting a voltage value of power stored in a storage battery and supplying DC power from the storage battery to the inverter when power supply by the AC power supply is abnormal. The converter includes a first three-level circuit which is a multi-level circuit. Similarly, the DC voltage converter includes a second three-level circuit. A control device controls the first and second multi-level circuits to suppress potential fluctuation at a neutral point between first and second capacitors.

16 Claims, 27 Drawing Sheets

U.S. PATENT DOCUMENTS

| | | | |
|---|---|---|---|
| 6,690,565 B2 * | 2/2004 | Montreuil | 361/232 |
| 6,775,157 B2 * | 8/2004 | Honda | 363/39 |
| 7,274,576 B1 * | 9/2007 | Zargari et al. | 363/39 |
| 7,948,206 B2 * | 5/2011 | Buschbeck et al. | 318/811 |
| 8,169,179 B2 * | 5/2012 | Mohan et al. | 318/800 |
| 2006/0227483 A1 | 10/2006 | Akagi | |
| 2007/0216452 A1 | 9/2007 | Matsumoto et al. | |

FOREIGN PATENT DOCUMENTS

| | | |
|---|---|---|
| JP | 2006 109603 | 4/2006 |
| JP | 2007 246038 | 9/2007 |
| JP | 2008 11606 | 1/2008 |
| WO | 2004 045055 | 5/2004 |

OTHER PUBLICATIONS

International Search Report issued Nov. 25, 2008 in PCT/JP08/64966 filed Aug. 22, 2008.

U.S. Appl. No. 13/498,009, filed Mar. 23, 2012, Sato, et al.

U.S. Appl. No. 13/498,515, filed Mar. 27, 2012, Sato, et al.

* cited by examiner

| Vu | Vv | Vu-Vv |
|---|---|---|
| E/2 | E/2 | 0 |
| E/2 | -E/2 | E |
| -E/2 | E/2 | -E |
| -E/2 | -E/2 | 0 |

| Vu | Vv | Vu-Vv |
|---|---|---|
| E/2 | E/2 | 0 |
| E/2 | 0 | E/2 |
| E/2 | -E/2 | E |
| 0 | E/2 | -E/2 |
| 0 | 0 | 0 |
| 0 | -E/2 | E/2 |
| -E/2 | E/2 | -E |
| -E/2 | 0 | -E/2 |
| -E/2 | -E/2 | 0 |

|  | TWO-LEVEL | THREE-LEVEL | RATIO TO TWO-LEVEL |
|---|---|---|---|
| CONDUCTION LOSS(W) | 417 | 713 | 171% |
| SWITCHING LOSS(W) | 723 | 238 | 33% |
| TOTAL(W) | 1140 | 951 | 83% |

| Q1D | Q2D | Q3D | Q4D | VOLTAGE APPLIED TO REACTOR |
|-----|-----|-----|-----|---------------------------|
| OFF | ON  | ON  | OFF | $-V_B$ |
| ON  | OFF | OFF | ON  | $E-V_B$ |
| ON  | OFF | ON  | OFF | $E/2-V_B$ |
| OFF | ON  | OFF | ON  | $E/2-V_B$ |

FIG.24

|  | Q1 | Q2 | Q3 | Q4 |
|---|---|---|---|---|
| MODE 1 | ON | ON | OFF | OFF |
| MODE 2 | OFF | ON | ON | OFF |
| MODE 3 | OFF | OFF | ON | ON |

FIG.29

|        | Q1D | Q2D | Q3D | Q4D |
|--------|-----|-----|-----|-----|
| MODE 1 | ON  | OFF | ON  | OFF |
| MODE 2 | OFF | OFF | OFF | OFF |
| MODE 3 | OFF | ON  | OFF | ON  |

POWER CONVERSION APPARATUS

TECHNICAL FIELD

The present invention relates to a power conversion apparatus for outputting AC power based on DC power, such as an uninterruptible power supply system, a solar power generation system, a fuel cell power generation system, or a secondary battery energy storage system.

BACKGROUND ART

An uninterruptible power supply system has widely been used as a power supply device for supplying AC power to an important load such as a computer system in a stable manner. For example, as disclosed in Japanese Patent Laying-Open No. 2006-109603 (Patent Document 1), an uninterruptible power supply system generally includes a converter for converting AC power to DC power, an inverter for converting DC power to AC power, and a capacitor for smoothing DC voltage input to the inverter. Usually, the converter converts AC power from a commercial AC power supply to DC power, and supplies the DC power to the inverter while charging a power storage device such as a storage battery. The inverter converts DC power to AC power and supplies the AC power to the load. When the commercial AC power supply fails, power from the power storage device is supplied to the inverter, which continues to supply AC power to the load.
Patent Document 1: Japanese Patent Laying-Open No. 2006-109603

DISCLOSURE OF THE INVENTION

Problems to be Solved by the Invention

The filter above includes a reactor and a capacitor. When a harmonic is great, for example, a reactor having great inductance should be used. For example, the number of turns of a coil may be increased in order to increase inductance of the reactor, however, volume and weight of reactance increase. Therefore, increase in inductance of the reactor leads to a problem of increase in volume and weight of the uninterruptible power supply system. Japanese Patent Laying-Open No. 2006-109603, however, does not show a specific solution to the problem of increase in size of the uninterruptible power supply system described above.

In addition, as described in Japanese Patent Laying-Open No. 2006-109603, a configuration in which a plurality of capacitors are connected in series on the DC side of the inverter is not essential in a two-level inverter circuit. When a multi-level circuit is used in the inverter, however, a plurality of capacitors must be connected in series between a positive terminal and a negative terminal on the DC side of the inverter. For example, when the inverter is implemented by a three-level circuit, two capacitors are connected in series between the positive electrode terminal and the negative electrode terminal on the DC side of the inverter. In addition, wiring is required from the multi-level circuit to a point of connection (neutral point) between the two capacitors. In this case, since currents flowing through the two capacitors become different from each other depending on a current flowing into the neutral point, DC voltages of both capacitors can become imbalanced. When the DC voltages of both capacitors become imbalanced, an excess voltage may be applied to one capacitor, for example. Therefore, when the wiring exists at the neutral point, potential fluctuation at the neutral point must be suppressed to equalize the DC voltages of both capacitors. In the following, control for equalizing DC voltages of two capacitors will be referred to as "balance control."

An object of the present invention is to provide a power conversion apparatus that has a configuration suitable for achieving reduction in size and lighter weight and that can achieve balance control over a DC capacitor without adding a special circuit.

Means for Solving the Problems

According to one aspect of the present invention, a power conversion apparatus includes first, second and third conversion devices and a filter. The first conversion device includes a first multi-level circuit configured to be able to perform conversion between a DC voltage and an AC voltage varying among at least three voltage values, and converts DC power to AC power for supply to a load. The second conversion device converts AC power from an AC power supply to DC power for supply to the first conversion device. The third conversion device converts a voltage value of power stored in a power storage device and supplies DC power from the power storage device to the first conversion device when power supply by the AC power supply is abnormal. The filter includes a reactor and a capacitor and removes a harmonic generated by the first conversion device.

According to another aspect of the present invention, a power conversion apparatus includes first and second capacitors, a second multi-level circuit, a DC power supply source, a third multi-level circuit, and a control device. The first and second capacitors are connected in series between a DC positive bus and a DC negative bus. The second multi-level circuit is connected to the DC positive bus, the DC negative bus and a neutral point between the first and second capacitors, for converting AC power supplied from an AC power supply to an input end to DC power and outputting the DC power to between the DC positive bus and the DC negative bus. The third multi-level circuit is connected to the DC positive bus, the DC negative bus and the neutral point in parallel to the second multi-level circuit, for converting a voltage of DC power supplied from the DC power supply source to the input end and outputting the DC power to between the DC positive bus and the DC negative bus. The control device controls operation of the second and third multi-level circuits to suppress potential fluctuation at the neutral point.

Effects of the Invention

According to the present invention, reduction in size and lighter weight of the power conversion apparatus can be achieved, and balance control over the DC capacitor can be achieved without adding a special circuit.

BRIEF DESCRIPTION OF THE DRAWINGS

FIG. 24 is a diagram showing a switching pattern of four IGBT elements included in an arm of each phase of the converter, in each mode.

FIG. 29 is a diagram showing a switching pattern of IGBT elements Q1D to Q4D included in semiconductor switch 23.

Figure 1:
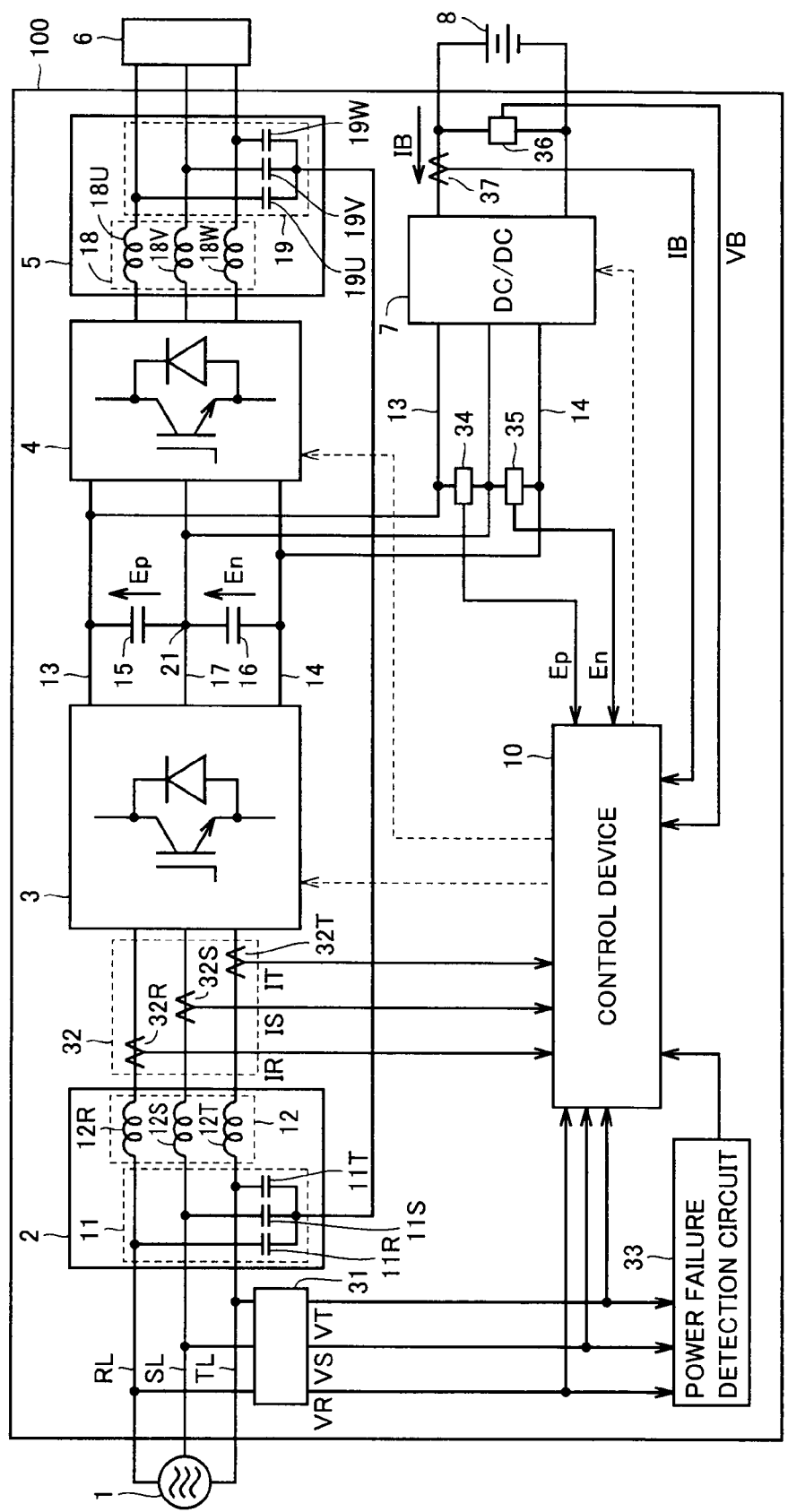
FIG. 1 is a schematic block diagram showing a main circuit configuration of an uninterruptible power supply system 100 according to an embodiment of the present invention.

DESCRIPTION OF THE REFERENCE SIGNS 1 commercial AC power supply; 2 input filter; 3 converter; 3R R-phase arm; 3S S-phase arm; 3T T-phase arm; 4 inverter; 4U U-phase arm; 4V V-phase arm; 4W W-phase arm; 5 output filter; 6 load; 7 DC voltage converter; 8 storage battery; 10 control device; 11, 11R, 11S, 11T, 15, 16, 19, 19U, 19V, 19W capacitor; 12, 12R, 12S, 12T, 18, 18U, 18V, 18W, 22, 22N, 22P, 45 reactor; 13 DC positive bus; 14 DC negative bus; 17 DC neutral point bus; 21 neutral point; 23, 44 semiconductor switch; 31, 34, 35, 36 voltage sensor; 32, 37 current sensor; 33 power failure detection circuit; 51, 63A to 63C, 73A, 88A to 88C adder; 52, 82, 86A to 86C, 73B, 82, 92, 94 subtractor; 53 converter control unit; 54 semiconductor switch control unit; 61, 71 voltage instruction generation circuit; 62, 72 neutral point potential control circuit; 64, 74 stop circuit; 64A to 64C, 74A, 74B switch; 65 PWM circuit; 75 PWM circuit; 81, 91 reference value generation circuit; 83 DC voltage control circuit; 84 sinusoidal wave generation circuit; 85A to 85C multiplier; 87, 95 current control circuit; 93 voltage control circuit; 100 uninterruptible power supply system; 101, 102, 151, 152 reference signal; 103 to 105, 153 to 155 voltage instruction signal; 106 to 108 phase voltage; 111 to 114, 121 to 124, 131 to 134, 161 to 164, 171 to 174, 181 to 184 switching pattern; 141 input phase voltage; 142 phase current; CA, CB, CC, CD capacitor; D1D to D4D, D1R to D6R, D1S to D6S, D1T to D6T, D1U to D6U, D1V to D6V, D1W to D6W, DA, DB, DC, DD diode; Q1D to Q4D, Q1R to Q4R, Q1S to Q4S, Q1T to Q4T, Q1U to Q4U, Q1V to Q4V, Q1W to Q4W, QA, QB, QC, QD IGBT element; RL R-phase line; SL S-phase line; TL T-phase line; UL U-phase line; VL V-phase line; and WL W-phase line.

BEST MODES FOR CARRYING OUT THE INVENTION

An embodiment of the present invention will be described hereinafter in detail with reference to the drawings. It is noted that the same or corresponding elements in the drawings have the same reference characters allotted and description thereof will not be repeated.

FIG. 1 is a schematic block diagram showing a main circuit configuration of an uninterruptible power supply system 100 according to an embodiment of the present invention. Referring to FIG. 1, uninterruptible power supply system 100 includes an input filter 2, a converter 3, an inverter 4, an output filter 5, a DC voltage converter (denoted as "DC/DC" in the drawing) 7, a control device 10, a DC positive bus 13, a DC negative bus 14, capacitors 15 and 16, a DC neutral point bus 17, voltage sensors 31, 34, 35, and 36, current sensors 32 and 37, a power failure detection circuit 33, an R-phase line RL, an S-phase line SL, and a T-phase line TL.

Input filter 2 prevents leakage of harmonics to a commercial AC power supply 1. Commercial AC power supply 1 is a three-phase AC power supply. Input filter 2 is a three-phase LC filter circuit constituted of a capacitor 11 (capacitors 11R, 11S and 11T) and a reactor 12 (reactors 12R, 12S and 12T).

Converter 3 converts three-phase AC power supplied from commercial AC power supply 1 through input filter 2 into DC power and supplies the DC power to inverter 4 through DC positive bus 13 and DC negative bus 14. Inverter 4 converts the DC power from converter 3 into three-phase AC power. As will be described later, converter 3 and inverter 4 are each implemented by a three-level circuit. Converter 3 and inverter 4 are connected to each other through DC positive bus 13, DC negative bus 14 and DC neutral point bus 17.

Capacitors 15 and 16 are connected in series between DC positive bus 13 and DC negative bus 14 and they smooth a voltage across DC positive bus 13 and DC negative bus 14. DC neutral point bus 17 is connected to a neutral point 21 which is a point of connection between capacitors 15 and 16.

The AC power from inverter 4 is supplied to a load 6 through output filter 5. Output filter 5 removes harmonics generated by an operation of inverter 4. Output filter 5 is a three-phase LC filter circuit constituted of a reactor 18 (reactors 18U, 18V and 18W) and a capacitor 19 (capacitors 19U, 19V and 19W).

DC voltage converter 7 converts a voltage of a storage battery 8 to a DC voltage across DC positive bus 13 and DC negative bus 14. It is noted that DC voltage converter 7 may be configured to carry out conversion between the DC voltage across DC positive bus 13 and DC negative bus 14 and the voltage of storage battery 8. In addition, a power storage device that can be charged and can discharge should only be connected to DC voltage converter 7, and for example, an electric double layer capacitor may be connected to DC voltage converter 7. In addition, though storage battery 8 is installed outside uninterruptible power supply system 100 in the present embodiment, storage battery 8 may be contained in uninterruptible power supply system 100.

Voltage sensor 31 detects a voltage VR of the R-phase line, a voltage VS of the S-phase line, and a voltage VT of the T-phase line, and outputs three-phase voltage signals indicating respective voltages VR, VS and VT to control device 10 and power failure detection circuit 33. Current sensor 32 detects a current IR of the R-phase line, a current IS of the S-phase line, and a current IT of the T-phase line and outputs three-phase current signals indicating respective voltages IR, IS and IT to control device 10.

Power failure detection circuit 33 detects power failure of commercial AC power supply 1 based on the three-phase voltage signal from voltage sensor 31. Power failure detection circuit 33 outputs a power failure signal indicating power failure of commercial AC power supply 1 to control device 10.

The voltage across DC positive bus 13 and DC negative bus 14 is divided into voltages Ep and En at neutral point 21. Voltage sensor 34 detects voltage Ep across opposing ends of capacitor 15 and outputs a signal indicating voltage Ep to control device 10. Voltage sensor 35 detects voltage En across opposing ends of capacitor 16 and outputs a signal indicating voltage En to control device 10. Voltage sensor 36 detects a voltage VB across positive and negative electrodes of storage battery 8 and outputs a signal indicating voltage VB to control device 10. Current sensor 37 detects a current IB output from storage battery 8 and outputs a signal indicating current IB to control device 10.

Control device 10 controls operations of converter 3, inverter 4 and DC voltage converter 7. Though detailed description will be provided later, each of converter 3, inverter 4 and DC voltage converter 7 is implemented by a semiconductor switch including a semiconductor switching element. In the present embodiment, an IGBT (Insulated Gate Bipolar Transistor) is employed as the semiconductor switching element. In addition, in the present embodiment, PWM (Pulse Width Modulation) control is applicable as a method of controlling the semiconductor switching element. Control device 10 carries out PWM control, upon receiving the three-phase voltage signal from voltage sensor 31, the three-phase current signal from current sensor 32, the signal indicating voltage Ep detected by voltage sensor 34, the signal indicating voltage En detected by voltage sensor 35, the power failure signal from power failure detection circuit 33, the signal indicating voltage VB detected by voltage sensor 36, the signal indicating current IB detected by current sensor 37, and the like.

An operation of uninterruptible power supply system 100 according to the present embodiment will now be described. When commercial AC power supply 1 can normally supply AC power, converter 3 converts AC power from commercial AC power supply 1 to DC power and inverter 4 converts the DC power into AC power and supplies the AC power to load 6. On the other hand, when the commercial AC power supply fails, control device 10 stops converter 3 based on the power failure signal from power failure detection circuit 33. In addition, control device 10 operates DC voltage converter 7 such that DC power is supplied from storage battery 8 to inverter 4, thus causing inverter 4 to continue supply of AC power. Here, DC voltage converter 7 converts the voltage of storage battery 8 into a voltage suitable as an input voltage for inverter 4. Thus, AC power can be supplied to an AC load in a stable manner.

Figure 2:
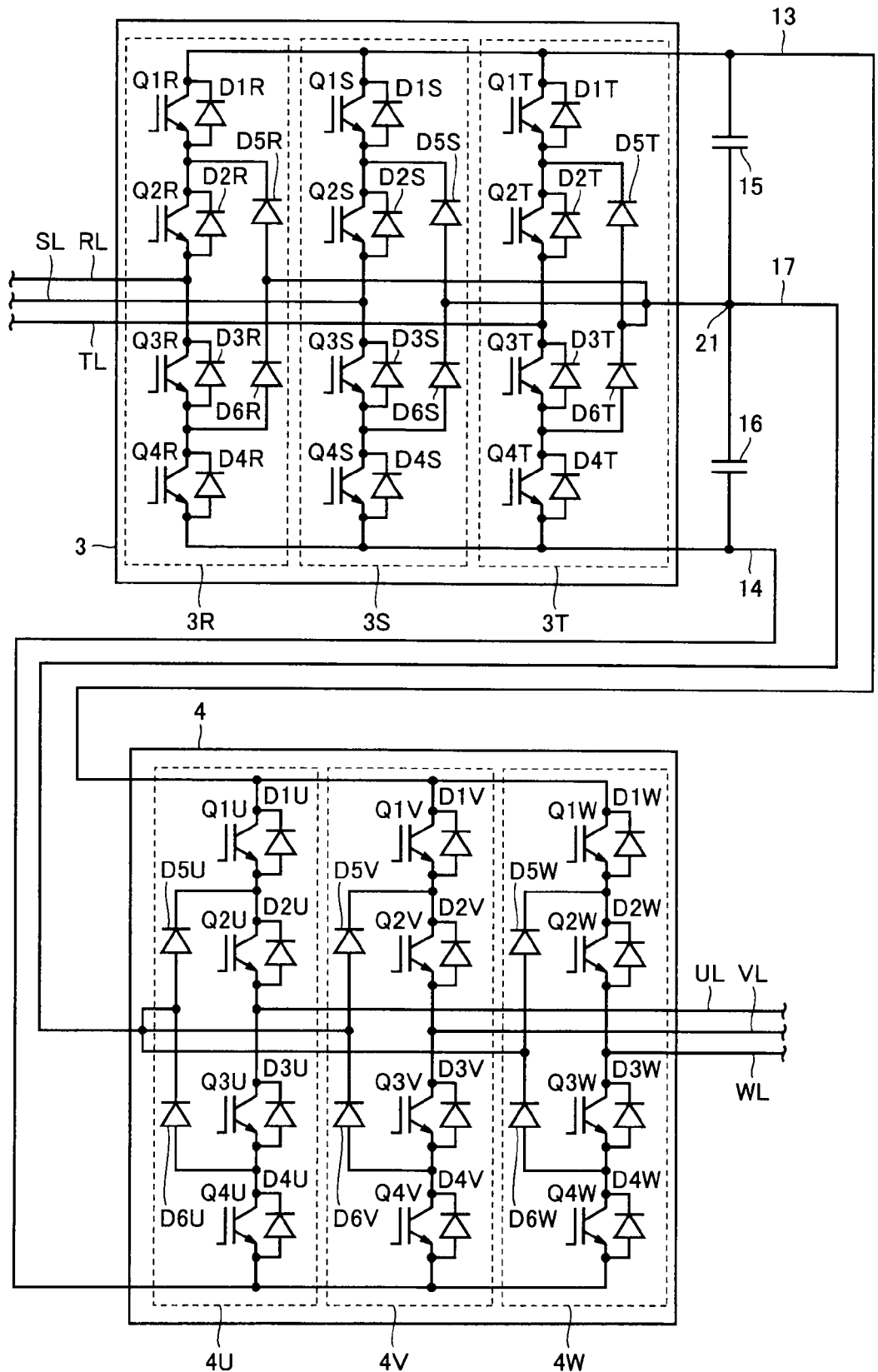
FIG. 2 is a circuit diagram illustrating in detail a configuration of a converter 3 and an inverter 4 shown in FIG. 1.

FIG. 2 is a circuit diagram illustrating in detail a configuration of converter 3 and inverter 4 shown in FIG. 1. Referring to FIG. 2, converter 3 includes an R-phase arm 3R, an S-phase arm 3S and a T-phase arm 3T. Inverter 4 includes a U-phase arm 4U, a V-phase arm 4V and a W-phase arm 4W.

The arm of each phase (3R, 3S, 3T) of converter 3 and the arm of each phase (4U, 4V, 4W) of inverter 4 are each implemented by a three-level circuit, and each of them includes four IGBT elements and six diodes. Specifically, R-phase arm 3R includes IGBT elements Q1R to Q4R and diodes D1R to D6R. S-phase arm 3S includes IGBT elements Q1S to Q4S and diodes D1S to D6S. T-phase arm 3T includes IGBT elements Q1T to Q4T and diodes D1T to D6T. U-phase arm 4U includes IGBT elements Q1U to Q4U and diodes D1U to D6U. V-phase arm 4V includes IGBT elements Q1V to Q4V and diodes D1V to D6V. W-phase arm 4W includes IGBT elements Q1W to Q4W and diodes D1W to D6W.

Hereinafter, in order to collectively describe the arm of each phase of converter 3 and the arm of each phase of inverter 4, reference characters R, S, T, U, V, and W are collectively denoted as a reference character "x". IGBT elements Q1$x$ to Q4$x$ are connected in series between DC positive bus 13 and DC negative bus 14. Diodes D1$x$ to D4$x$ are connected in anti-parallel to IGBT elements Q1$x$ to Q4$x$, respectively. Diode D5$x$ is connected to a point of connection between IGBT elements Q1$x$ and Q2$x$ and neutral point 21. Diode D6$x$ is connected to a point of connection between IGBT elements Q3$x$ and Q4$x$ and neutral point 21. It is noted that diode D5$x$ has a cathode connected to the point of connection between IGBT elements Q1$x$ and Q2$x$ and has an anode connected to neutral point 21. Diode D6$x$ has an anode connected to the point of connection between IGBT elements Q3$x$ and Q4$x$ and has a cathode connected to neutral point 21. Diodes D1$x$ to D4$x$ function as free-wheeling diodes, and diodes D5$x$ and D6$x$ function as clamp diodes.

In the arm of each phase (3R, 3S, 3T) of converter 3, a point of connection between IGBT elements Q2$x$ and Q3$x$ corresponds to an AC input terminal, and a point of connection between diodes D5$x$ and D6$x$ corresponds to a DC output terminal. Meanwhile, in the arm of each phase (4U, 4V, 4T) of inverter 4, the point of connection between diodes D5$x$ and D6$x$ corresponds to a DC input terminal, and the point of connection between IGBT elements Q2$x$ and Q3$x$ corresponds to an AC output terminal. The AC input terminal of the arm of each phase (3R, 3S, 3T) of converter 3 is connected to a corresponding line (R-phase line RL, S-phase line SL, T-phase line TL), and the AC output terminal of the arm of each phase (4U, 4V, 4S) of inverter 4 is connected to a corresponding line (U-phase line UL, V-phase line VL, W-phase line WL). The DC output terminal of the arm of each phase of converter 3 and the DC input terminal of the arm of each phase of inverter 4 are connected to neutral point 21.

Figure 3:
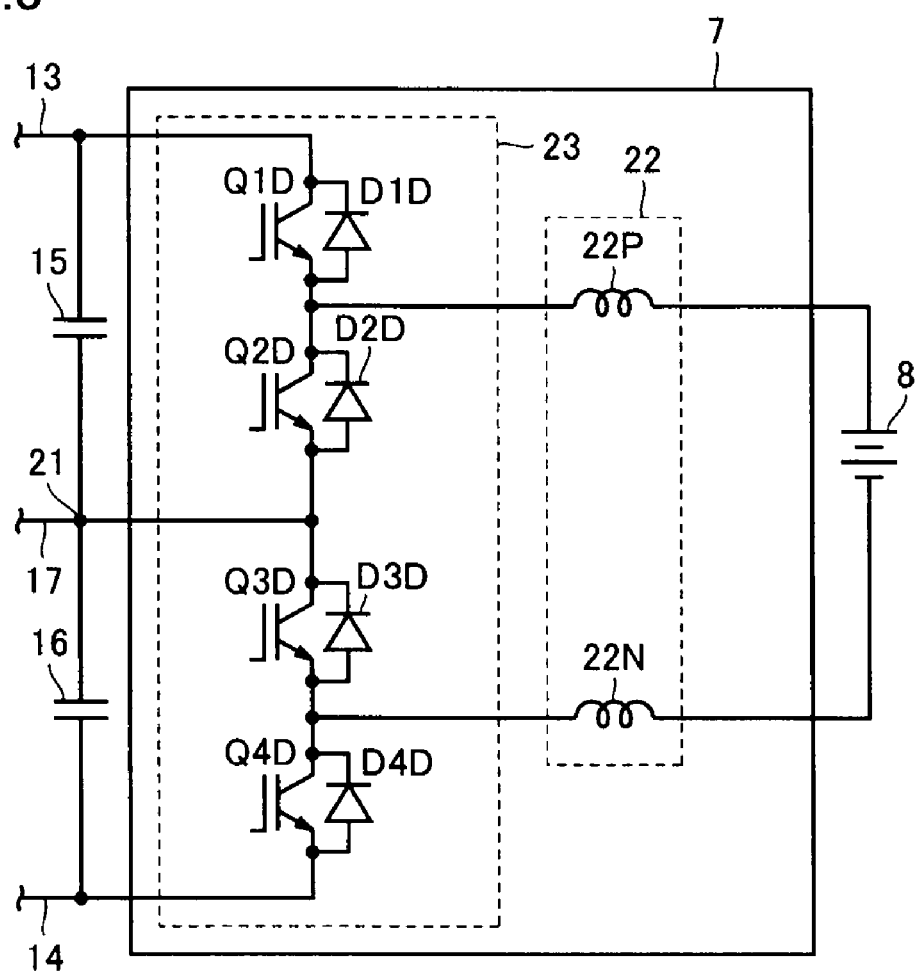
FIG. 3 is a diagram illustrating in detail a configuration of a DC voltage converter 7 shown in FIG. 1.

FIG. 3 is a diagram illustrating in detail a configuration of DC voltage converter 7 shown in FIG. 1. Referring to FIG. 3, DC voltage converter 7 includes a reactor 22 and a semiconductor switch 23. Semiconductor switch 23 includes IGBT elements Q1D to Q4D connected in series between DC positive bus 13 and DC negative bus 14 and diodes D1D to D4D connected in anti-parallel to IGBT elements Q1D to Q4D, respectively.

In semiconductor switch 23, one end of a reactor 22P is connected to a point of connection between IGBT elements Q1D and Q2D and one end of a reactor 22N is connected to a point of connection between IGBT elements Q3D and Q4D. The other end of reactor 22P is connected to the positive electrode of storage battery 8 and the other end of reactor 22N is connected to the negative electrode of storage battery 8.

Figure 4:
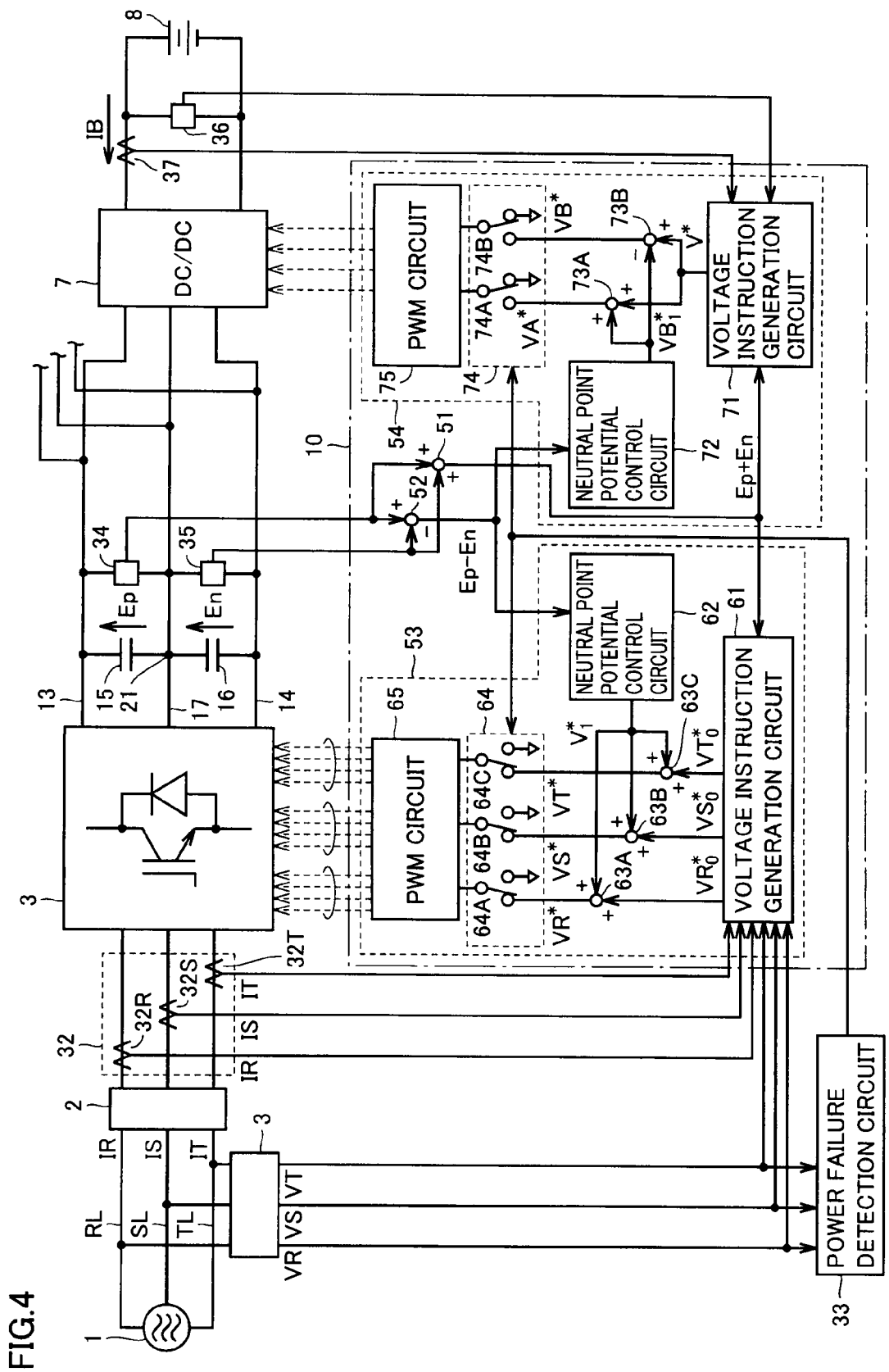
FIG. 4 is a block diagram illustrating control units of converter 3 and DC voltage converter 7 included in a control device 10.

FIG. 4 is a block diagram illustrating control units of converter 3 and DC voltage converter 7 included in control device 10. Referring to FIG. 4, control device 10 includes an adder 51, a subtractor 52, a converter control unit 53, and a semiconductor switch control unit 54. Adder 51 adds voltage value Ep indicating a voltage of capacitor 15 detected by voltage sensor 34 and value En of a voltage of capacitor 16 detected by voltage sensor 35, and outputs a voltage value (Ep+En) across DC positive bus 13 and DC negative bus 14. Subtractor 52 subtracts voltage value En from voltage value Ep and outputs a value of voltage difference (Ep−En).

Converter control unit 53 includes a voltage instruction generation circuit 61, a neutral point potential control circuit 62, adders 63A to 63C, a stop circuit 64, and a PWM circuit 65. Upon receiving voltages VR, VS and VT detected by voltage sensor 31, currents IR, IS and IT detected by current sensor 32, and voltage value (Ep+En) calculated by adder 51, voltage instruction generation circuit 61 generates voltage instruction values $VR_0^*$, $VS_0^*$ and $VT_0^*$ corresponding to the R phase, the S phase and the T phase, respectively. Upon receiving the value indicating voltage difference (Ep−En) from subtractor 52, neutral point potential control circuit 62 generates a voltage instruction value $V_1^*$. For example, neutral point potential control circuit 62 generates voltage instruction value $V_1^*$ by proportional operation or proportional integral operation of voltage difference (Ep−En).

Adder 63A adds voltage instruction values $VR_0^*$ and $V_1^*$ and generates a voltage instruction value VR*. Adder 63B adds voltage instruction values $VS_0^*$ and $V_1^*$ and generates a voltage instruction value VS*. Adder 63C adds voltage instruction values $VT_0^*$ and $V_1^*$ and generates a voltage instruction value VT*.

Stop circuit 64 includes switches 64A to 64C. When a signal from power failure detection circuit 33 indicates that commercial AC power supply 1 is normal (for example, when a logical value of the signal is "1"), switches 64A to 64C are set such that voltage instruction values VR*, VS* and VT* are transmitted to PWM circuit 65. When the signal from power failure detection circuit 33 indicates power failure of commercial AC power supply 1 (for example, when a logical value of the signal is "0"), switches 64A to 64C are all grounded. As a result, input of the voltage instruction values to PWM circuit 65 stops, and at the same time, an OFF signal is provided to all IGBT elements of converter 3 and converter 3 stops.

Based on voltage instruction values VR*, VS* and VT*, PWM circuit 65 outputs a signal for equalizing voltages VR, VS and VT detected by voltage sensor 31 and voltage instruction values VR*, VS* and VT*, respectively. This signal is for driving the four IGBT elements included in the arm of each phase of converter 3.

Semiconductor switch control unit 54 includes a voltage instruction generation circuit 71, a neutral point potential control circuit 72, an adder 73A, a subtractor 73B, a stop circuit 74, and a PWM circuit 75.

Upon receiving voltage VB detected by voltage sensor 36, current IB detected by current sensor 37 and voltage value (Ep+En) calculated by adder 51, voltage instruction generation circuit 71 generates a voltage instruction value V* for controlling voltage values Ep and En to prescribed voltages.

Upon receiving the value indicating voltage difference (Ep−En) from subtractor 52, neutral point potential control circuit 72 generates a voltage instruction value $VB_1^*$. For example, neutral point potential control circuit 72 generates voltage instruction value $Vb_1^*$ by proportional operation or proportional integral operation of voltage difference (Ep−En). For example, when Ep−En>0, neutral point potential control circuit 72 sets voltage instruction value $VB_1'$ to a negative value. On the other hand, when Ep−En<0, neutral point potential control circuit 72 sets voltage instruction value $VB_1^*$ to a positive value.

Adder 73A adds voltage instruction values V* and $VB_1^*$ and generates a voltage instruction value VA*. Subtractor 73B subtracts voltage instruction value $VB_1^*$ from voltage instruction value V* and generates a voltage instruction value VB*. Voltage instruction values VA* and VB* are instruction values for controlling voltages of an upper arm and a lower arm of semiconductor switch 23, respectively, and instruction values of voltages Ep and En for making a difference between voltages Ep and En zero. Neutral point potential control circuit 72, adder 73A and subtractor 73B configure an instruction value generation circuit that generates voltage instruction values VA* and VB* for controlling voltages Ep and En, respectively, to make voltage difference (Ep−En) zero based on voltage difference (Ep−En) and voltage instruction value V.

Stop circuit 74 includes switches 74A and 74B. When the signal from power failure detection circuit 33 indicates that commercial AC power supply 1 is normal, switches 74A and 74B are all grounded. As a result, input of the voltage instruction values to PWM circuit 75 stops, and at the same time, an OFF signal is provided to all IGBT elements of DC voltage converter 7 and DC voltage converter 7 stops. On the other hand, when the signal from power failure detection circuit 33 indicates power failure of commercial AC power supply 1, switches 74A and 74B are set such that voltage instruction values VA* and VB* are transmitted to PWM circuit 75 and an ON/OFF instruction is provided to the IGBT elements of DC voltage converter 7.

PWM circuit 75 outputs a signal for driving the four IGBT elements included in semiconductor switch 23, based on voltage instruction values VA* and VB*.

Figure 5:
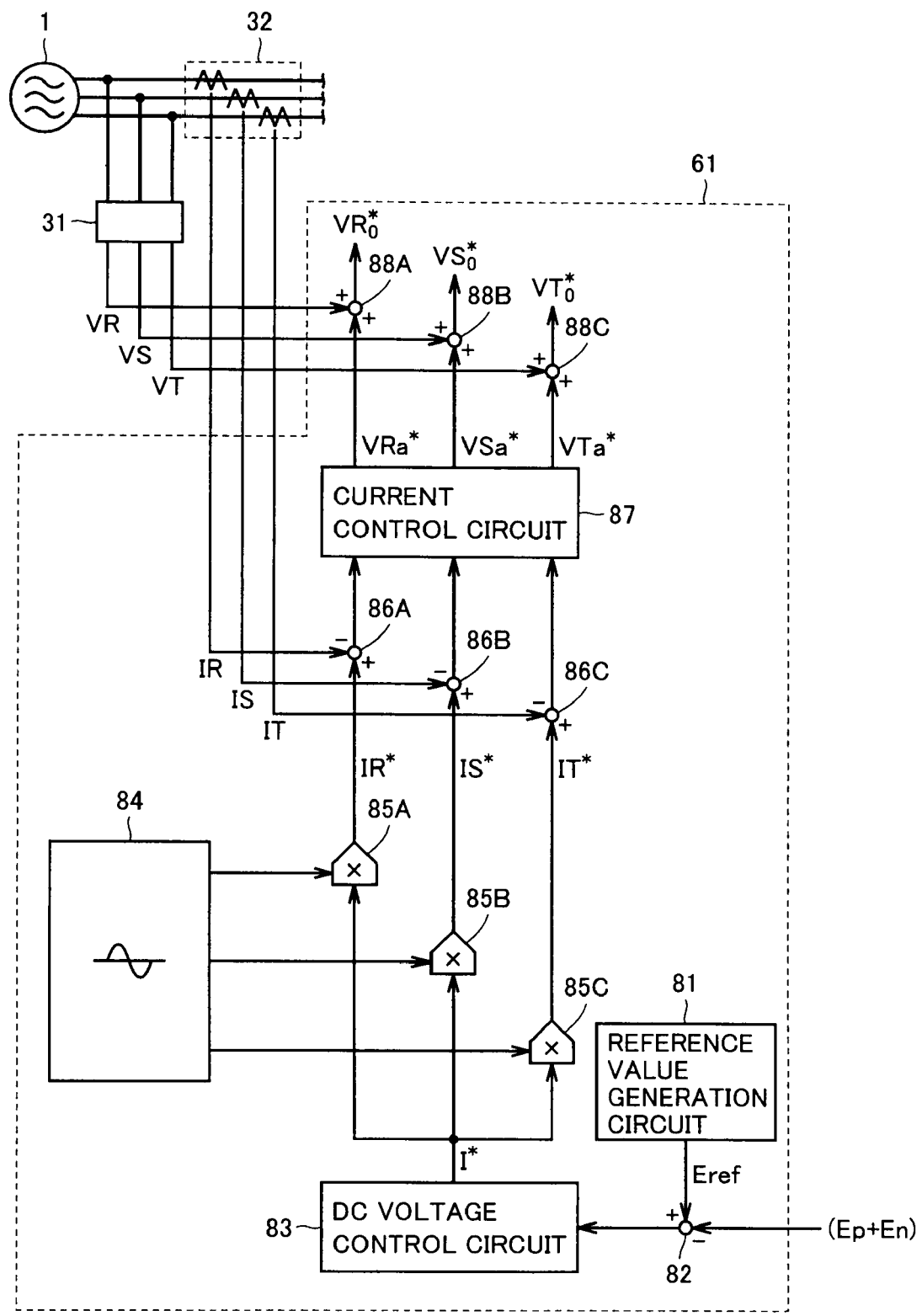
FIG. 5 is a functional block diagram of a voltage instruction generation circuit 61 shown in FIG. 4.

FIG. 5 is a functional block diagram of voltage instruction generation circuit 61 shown in FIG. 4. Referring to FIG. 5, voltage instruction generation circuit 61 includes a reference value generation circuit 81, subtractors 82 and 86A to 86C, a DC voltage control circuit 83, a sinusoidal wave generation circuit 84, multipliers 85A to 85C, and a current control circuit 87.

Reference value generation circuit 81 generates a reference value Eref which is a reference value of voltage value (Ep+En). Subtractor 82 calculates a difference between reference value Eref and voltage value (Ep+En) generated by adder 51. DC voltage control circuit 83 calculates a current instruction value I* for controlling a current flowing to the input side of converter 3 to make the difference between reference value Eref and voltage value (Ep+En) zero. DC voltage control circuit 83 calculates current instruction value I* by proportional operation or proportional integral operation of an error between the reference value and the detected voltage value, for example.

Sinusoidal wave generation circuit 84 outputs a sinusoidal wave signal of the same phase as an R-phase voltage of commercial AC power supply 1, a sinusoidal wave signal of the same phase as an S-phase voltage of commercial AC power supply 1, and a sinusoidal wave signal of the same phase as a T-phase voltage of commercial AC power supply 1. The three sinusoidal wave signals are input to multipliers 85A to 85C, respectively, and are multiplied by current instruction value I*. As a result, current instruction values IR* IS* and IT* of the same phase as the phase voltage of commercial AC power supply 1 are generated.

Subtractor 86A calculates a difference between current instruction value IR* and R-phase current IR detected by current sensor 32. Subtractor 86B calculates a difference between current instruction value IS* and S-phase current IS detected by current sensor 32. Subtractor 86C calculates a difference between current instruction value IT* and T-phase current IT detected by current sensor 32.

Current control circuit 87 generates voltage instruction values VRa*, VSa* and VTa* as a voltage to be applied to reactor 32 such that all of the difference between current instruction value IR* and R-phase current IR, the difference between current instruction value IS* and S-phase current IS, and the difference between current instruction value IT* and T-phase current IT become zero. Current control circuit 87 generates the voltage instruction value by amplifying the difference between the current value detected by the current sensor and the current instruction value in accordance with proportional control or proportional integral control, for example.

An adder 88A adds voltage instruction value VRa* and R-phase voltage VR detected by voltage sensor 31 and generates voltage instruction value $VR_0^*$. An adder 88B adds voltage instruction value VSa* and S-phase voltage VS detected by voltage sensor 31 and generates voltage instruction value $VS_0^*$. An adder 88C adds voltage instruction value VTa* and T-phase voltage VT detected by voltage sensor 31 and generates voltage instruction value $VT_0^*$.

Converter control unit 53 having the above configuration controls converter 3, and thus, currents IR, IS and IT become currents having sinusoidal waves and the same phase as commercial AC power supply 1. Therefore, the power factor can be set to substantially 1.

Figure 6:
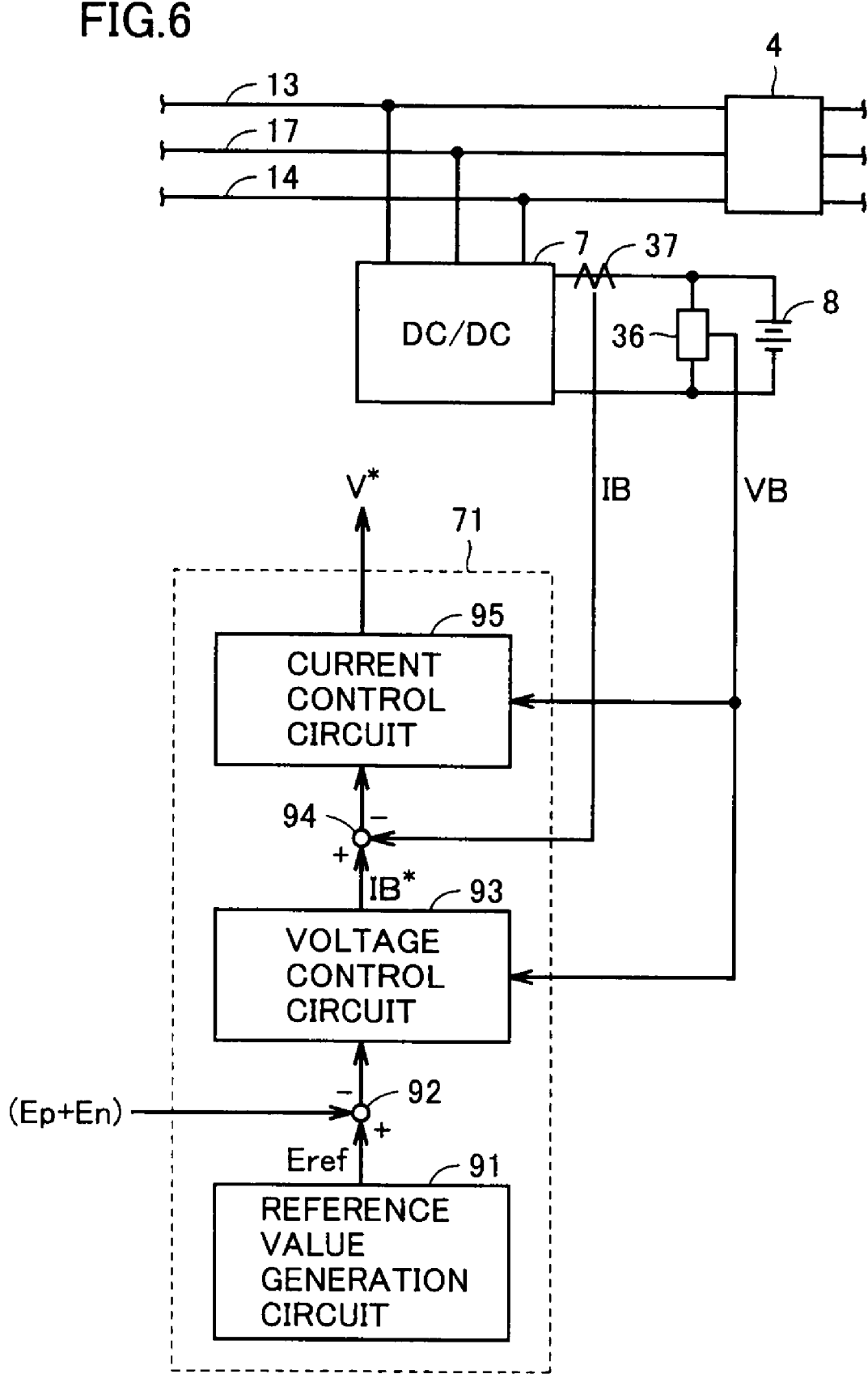
FIG. 6 is a functional block diagram of a voltage instruction generation circuit 71 shown in FIG. 4.

FIG. 6 is a functional block diagram of voltage instruction generation circuit 71 shown in FIG. 4. Referring to FIG. 6, voltage instruction generation circuit 71 includes a reference value generation circuit 91, a subtractor 92, a voltage control circuit 93, an adder 94, and a current control circuit 95. Reference value generation circuit 91 generates reference value Eref which is the reference value of voltage value (Ep+En). Subtractor 92 calculates a difference between reference value Eref and voltage value (Ep+En) generated by adder 51. Voltage control circuit 93 calculates a current instruction value IB* corresponding to the difference between reference value Eref and voltage value (Ep+En), based on voltage VB of storage battery 8 detected by voltage sensor 36. Voltage control circuit 93 calculates current instruction value IB* by proportional operation or proportional integral operation of an error between the reference value and the detected voltage value, for example. Adder 94 subtracts current instruction value IB* generated by voltage control circuit 93 and current value IB of storage battery 8 detected by current sensor 37. Current control circuit 95 generates voltage instruction value V* based on the difference between current instruction value IB* and current value IB.

In uninterruptible power supply system 100 according to the present embodiment, converter 3 and inverter 4 are each implemented by a three-level circuit. In a conventional power conversion apparatus, for the purpose of, for example, reducing the number of semiconductor switching elements, an inverter is generally implemented by a two-level circuit. By implementing the inverter with the three-level circuit, harmonics can be suppressed more than in the conventional power conversion apparatus.

Figure 7:
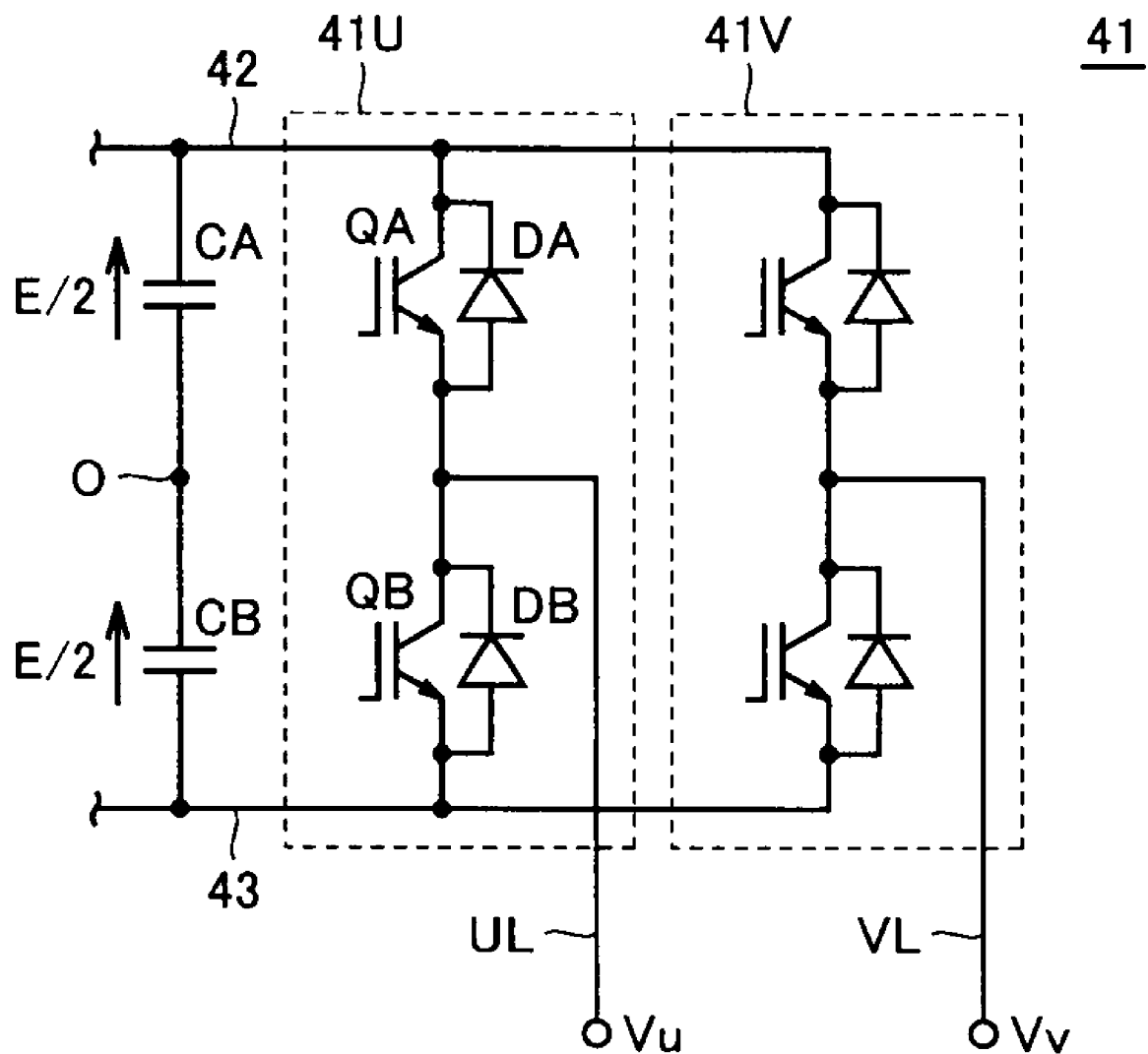
FIG. 7 is a diagram showing a single-phase inverter implemented by a two-level circuit.

FIG. 7 is a diagram showing a single-phase inverter implemented by a two-level circuit. Referring to FIG. 7, an inverter 41 includes a U-phase arm 41U and a V-phase arm 41V. U-phase arm 41U and V-phase arm 41V are connected in parallel between a DC positive bus 42 and a DC negative bus 43 and they are identical in configuration. U-phase arm 41U includes IGBT elements QA and QB connected in series between DC positive bus 42 and DC negative bus 43 and diodes DA and DB connected in anti-parallel to IGBT elements QA and QB, respectively. U-phase line UL is connected to a point of connection between IGBT elements QA and QB. V-phase arm 41V has such a configuration that U-phase line UL in the configuration of U-phase arm 41U above is replaced with V-phase line VL.

Capacitors CA and CB are connected in series between DC positive bus 42 and DC negative bus 43. A neutral point O is a point of connection between capacitors CA and CB. A voltage across opposing ends of capacitor CA and a voltage across opposing ends of capacitor CB are both E/2 (E being a prescribed value).

Figures 8, 9:
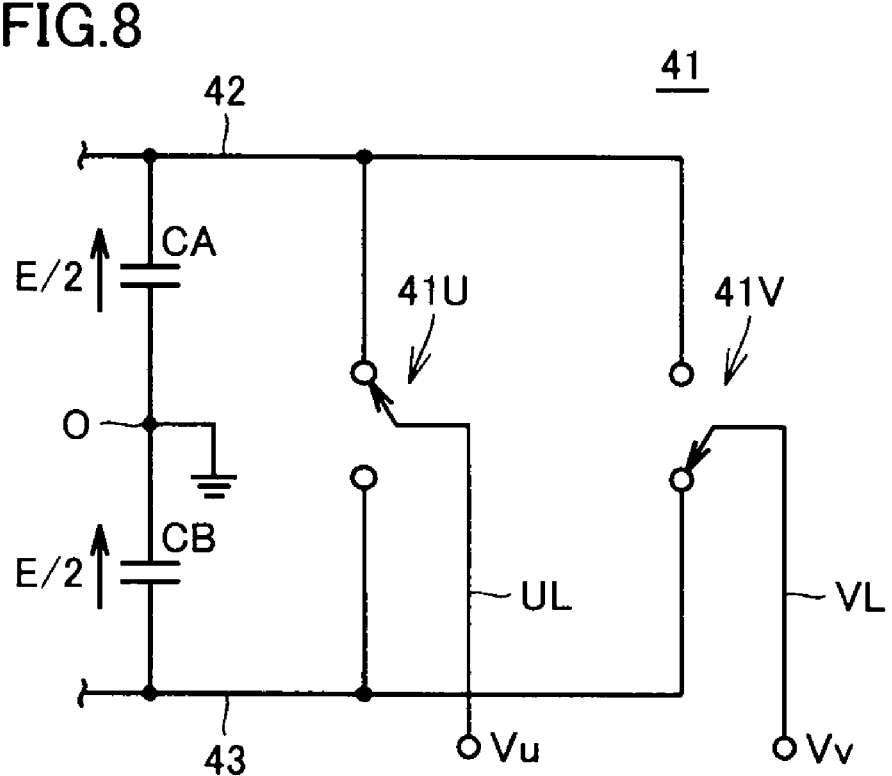
FIG. 8 is an equivalent circuit of an inverter 41 shown in FIG. 7.
FIG. 9 is a diagram showing a line voltage of inverter 41.

FIG. 8 is an equivalent circuit of inverter 41 shown in FIG. 7. Referring to FIG. 8, U-phase arm 41U is equivalent to a switch that switches connection of U-phase line UL between DC positive bus 42 and DC negative bus 43. Considering an example where neutral point O is grounded, when the switch operates, a voltage Vu of U-phase line UL switches between E/2 and −E/2. A voltage Vv of V-phase line VL varies similarly to voltage Vu. Thus, the two-level circuit converts a DC voltage E to an AC voltage having two values (E/2, −E/2).

FIG. 9 is a diagram showing a line voltage of inverter 41. Referring to FIG. 9, a line voltage (a difference between voltage Vu and voltage Vv) switches between E, 0, and −E. In an inverter implemented by a two-level circuit (a two-level inverter), a minimum variation of the line voltage is equal to voltage E.

Figures 10, 11:
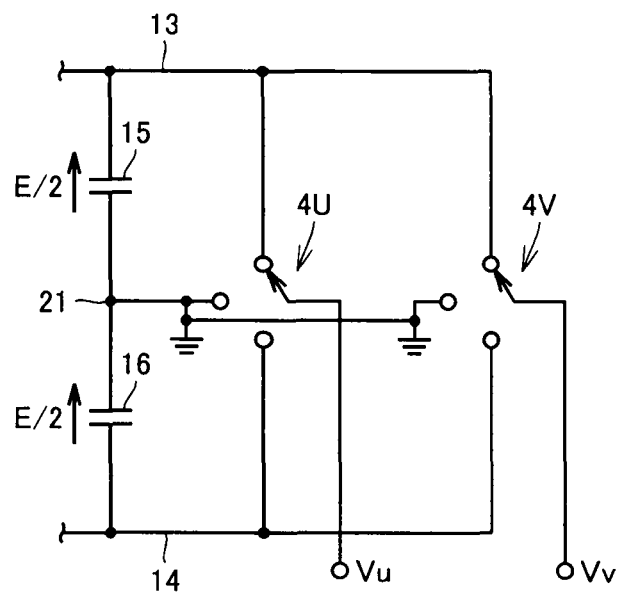
FIG. 10 is an equivalent circuit diagram of a U-phase arm 4U and a V-phase arm 4V of inverter 4 shown in FIG. 2.
FIG. 11 is a diagram showing a line voltage of a single-phase, three-level inverter shown in FIG. 10.

FIG. 10 is an equivalent circuit diagram of U-phase arm 4U and V-phase arm 4V of inverter 4 shown in FIG. 2. Referring to FIG. 10, U-phase arm 4U is equivalent to a switch that switches connection of U-phase line UL between DC positive bus 13, neutral point 21, and DC negative bus 14. When this switch operates, voltage Vu of U-phase line UL switches between E/2, 0 and −E/2. Voltage Vv of V-phase line VL also varies similarly to voltage Vu. Thus, the three-level circuit is a circuit capable of performing conversion between a DC voltage and an AC voltage having three values.

FIG. 11 is a diagram showing a line voltage of a single-phase, three-level inverter shown in FIG. 10. Referring to FIG. 11, the line voltage (a difference between voltage Vu and voltage Vv) switches in a range of E, E/2, 0, −E/2, and −E. In an inverter implemented by a three-level circuit (a three-level inverter), a minimum variation of the line voltage is equal to E/2.

It can be seen from FIGS. 9 and 11 that the three-level inverter is smaller in variation of the line voltage than the two-level inverter. Since a waveform of an output voltage of the inverter finely varies as the variation of the line voltage is smaller, the waveform can be closer to a sinusoidal wave. As the voltage waveform is closer to the sinusoidal wave, harmonics generated by the operation of the inverter can be made smaller. Therefore, harmonics can be made smaller by the three-level inverter than the two-level inverter.

Figure 12:
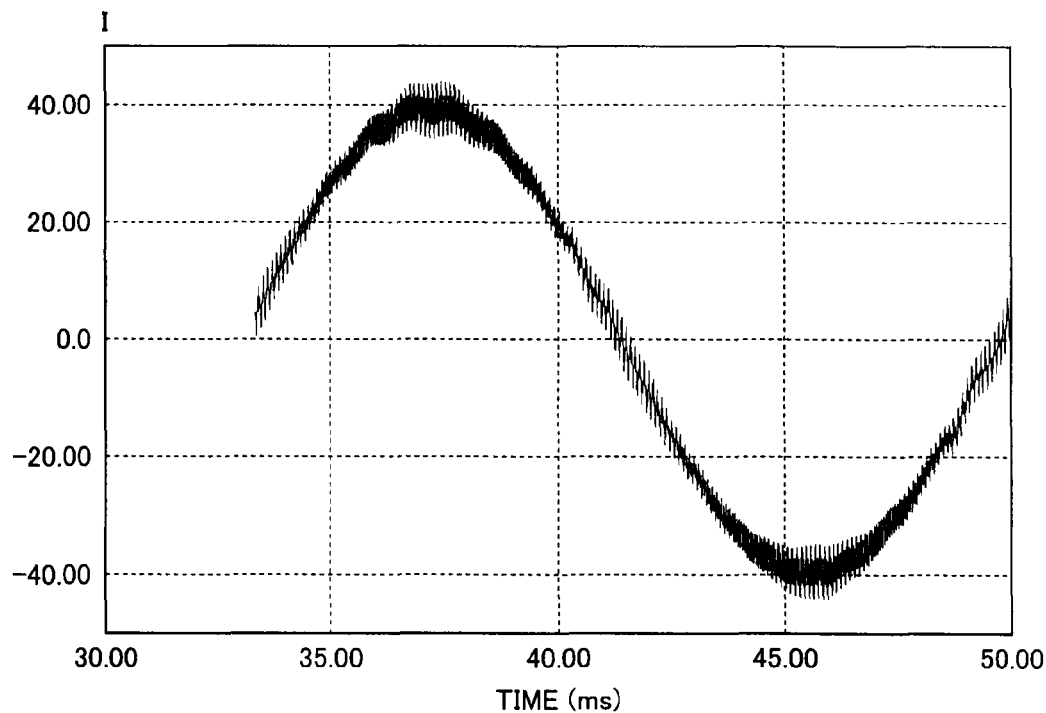
FIG. 12 is a diagram showing a result of simulation of a reactor current in an example where a filter reactor provided on an output side of a two-level inverter is set to 5% and the inverter is switched at a frequency of 10 kHz.
Figure 13:
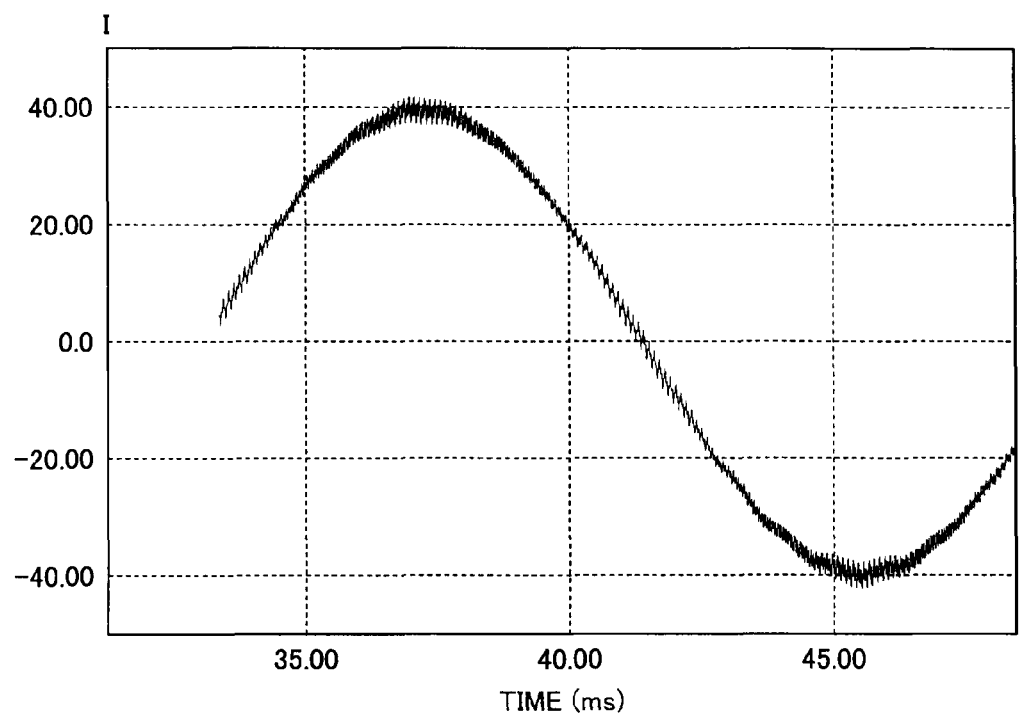
FIG. 13 is a diagram showing a result of simulation of a reactor current in an example where a filter reactor provided on an output side of a two-level inverter is set to 10% and the inverter is switched at a frequency of 10 kHz.

FIG. 12 is a diagram showing a result of simulation of a reactor current in an example where a filter reactor provided on an output side of a two-level inverter is set to 5% and the inverter is switched at a frequency of 10 kHz. FIG. 13 is a diagram showing a result of simulation of a reactor current in an example where a filter reactor provided on an output side of a two-level inverter is set to 10% and the inverter is switched at a frequency of 10 kHz. Comparing total harmonic distortion (THD) based on simulation in FIGS. 12 and 13, THD is 6.4% when reactor inductance is set to 5%, whereas THD decreases to 3.2% by increasing reactor inductance to 10%.

THD represents a ratio between the sum of effective values of harmonic components and effective values of fundamental waves. Smaller THD means smaller harmonic components. FIGS. 12 and 13 show that THD decreases by increasing reactor inductance. If reactor inductance is increased in order to make the harmonic components smaller, it is necessary, for example, to increase the number of turns of a coil, and a problem of increase in volume and weight of the reactor arises.

Figure 14:
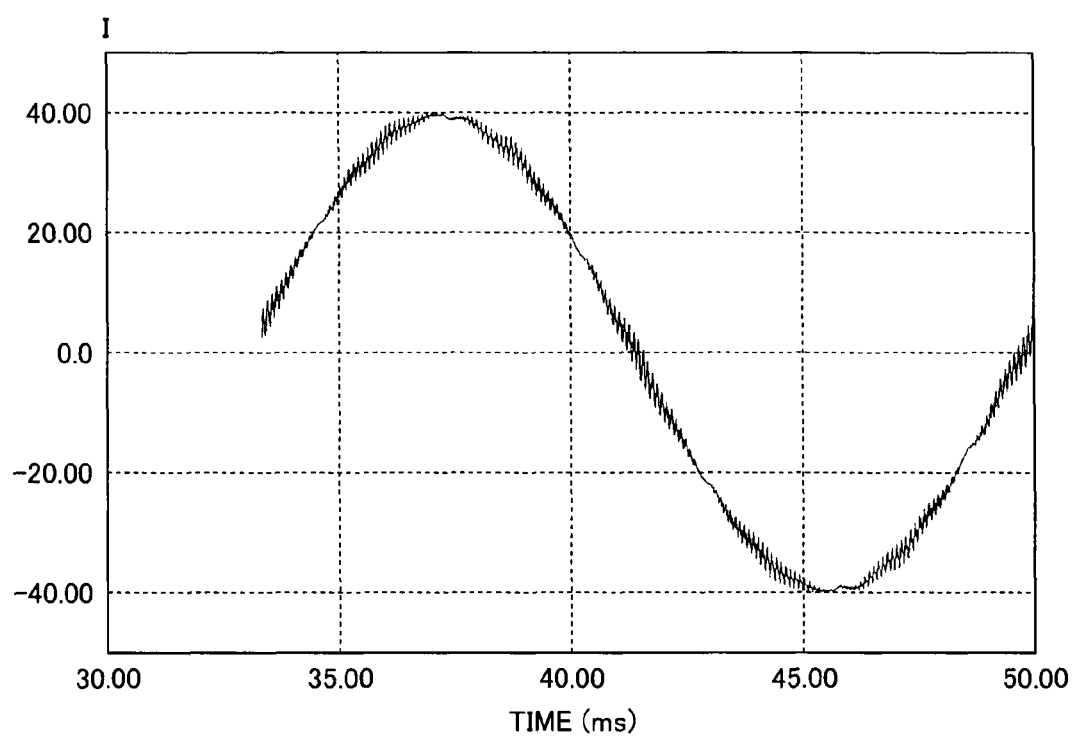
FIG. 14 is a diagram showing a result of simulation of a reactor current in an example where a filter reactor provided on an output side of a three-level inverter is set to 5% and the inverter is switched at a frequency of 10 kHz.

FIG. 14 is a diagram showing a result of simulation of a reactor current in an example where a filter reactor provided on an output side of a three-level inverter is set to 5% and the inverter is switched at a frequency of 10 kHz. Referring to FIGS. 14 and 12, it can be seen that the three-level inverter can suppress harmonic components more than the two-level inverter provided that filter reactors are identical in inductance. In the simulation result shown in FIG. 14, THD was 3.2%.

Figure 15:
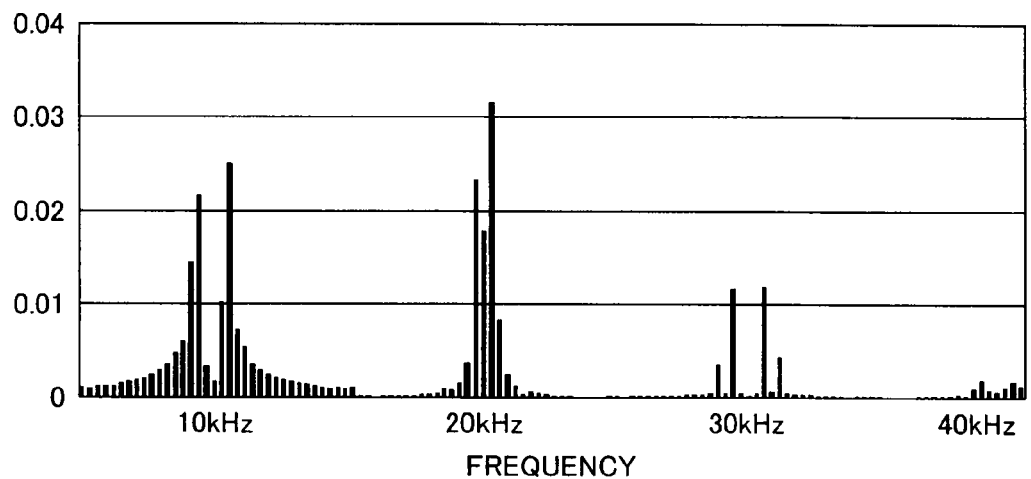
FIG. 15 is a diagram showing a frequency spectrum of a harmonic current (FIG. 12) generated by the two-level inverter.
Figure 16:
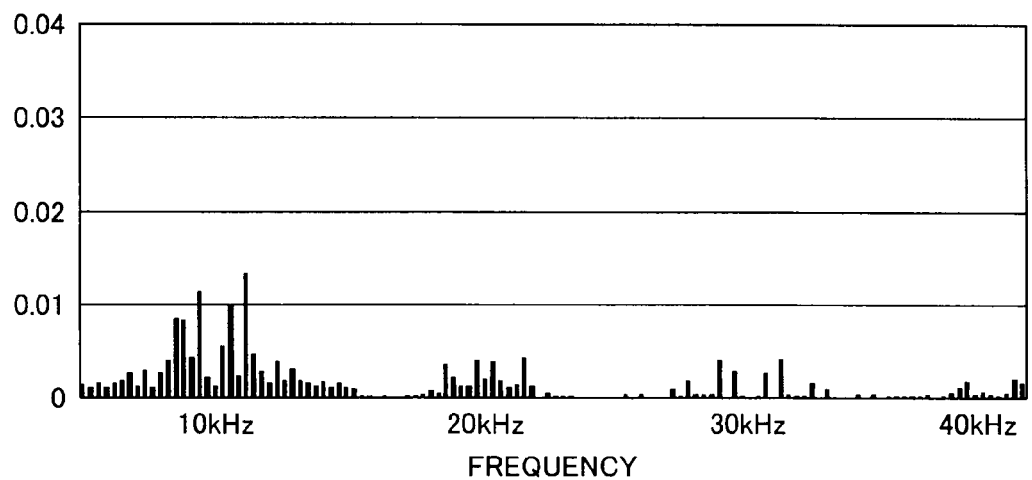
FIG. 16 is a diagram showing a frequency spectrum of a harmonic current (FIG. 14) generated by the three-level inverter.

FIG. 15 is a diagram showing a frequency spectrum of a harmonic current (FIG. 12) generated by the two-level inverter. FIG. 16 is a diagram showing a frequency spectrum of a harmonic current (FIG. 14) generated by the three-level inverter. Referring to FIGS. 15 and 16, it can be seen that the three-level inverter can suppress harmonics more than the two-level inverter, regardless of a frequency. It is noted that frequency spectra in FIGS. 15 and 16 could be obtained by simulation. In simulation, a DC voltage input to the inverter was set to 500 V, a three-phase resistance load of 10 kW was adopted as a load, and an output voltage (line voltage) was set to 208 Vrms.

Thus, according to the present embodiment, by implementing an inverter with a three-level circuit, harmonics generated by the inverter can be made smaller. As a reactor having small inductance can thus be used for the filter, the reactor can have smaller volume and weight. Therefore, according to the present embodiment, reduction in size and lighter weight of the power conversion apparatus can be achieved.

In the present embodiment, the following effects can also be obtained by implementing an inverter with a three-level circuit. In the power conversion apparatus, a storage battery or the like having large capacity is connected, as a DC power supply, to a DC capacitor on the input side of the inverter. When fluctuation of a potential to ground becomes greater during operation of the inverter, an amount of generated noise increases due to a large stray capacitance of a DC circuit. Since variation of the output voltage becomes greater by implementing inverter 4 with a two-level inverter, fluctuation of a potential to ground also becomes greater. In the present embodiment, however, by implementing inverter 4 with a three-level inverter, variation of the output voltage thereof can be made smaller than in a case of a two-level inverter. As fluctuation of a potential to ground can thus be made smaller, an amount of generated noise can be decreased.

Figure 17:
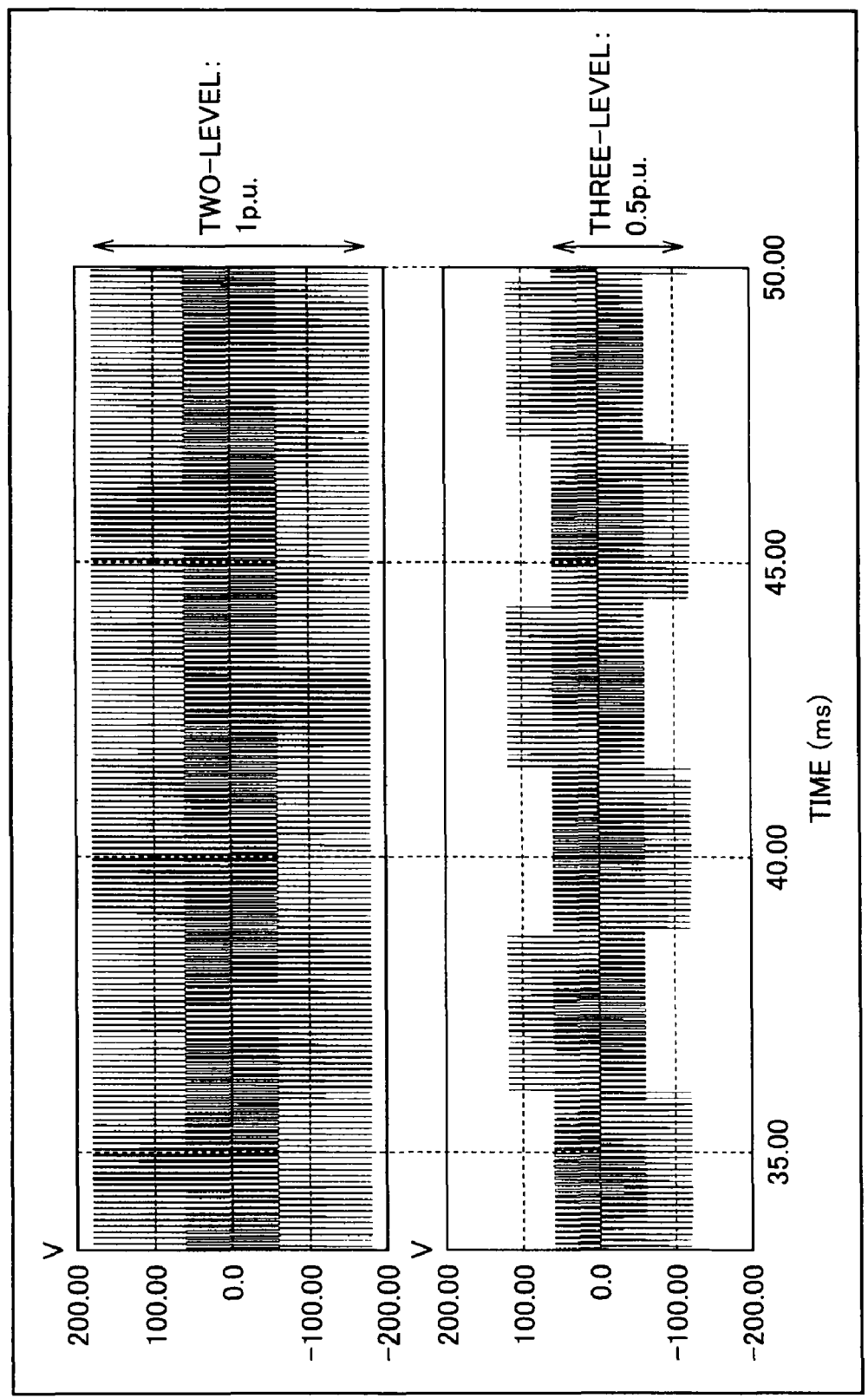
FIG. 17 is a diagram showing a result of simulation of fluctuation of a potential to ground of the two-level inverter and fluctuation of a potential to ground of the three-level inverter.

FIG. 17 is a diagram showing a result of simulation of fluctuation of a potential to ground of the two-level inverter and fluctuation of a potential to ground of the three-level inverter. In simulation, a DC voltage input to the inverter was set to 360 V. Referring to FIG. 17, assuming fluctuation of a potential to ground in the two-level inverter as 1 [p.u], fluctuation of a potential to ground in the three-level inverter is 0.5 [p.u]. As shown in FIG. 17, the three-level inverter can achieve smaller fluctuation of a potential to ground.

In addition, according to the present embodiment, loss in inverter 4 can be decreased. Loss in inverter 4 specifically refers to conduction loss (loss in each of the IGBT element and the diode when they are fed with power) and switching loss in the IGBT element.

Figures 18, 19:
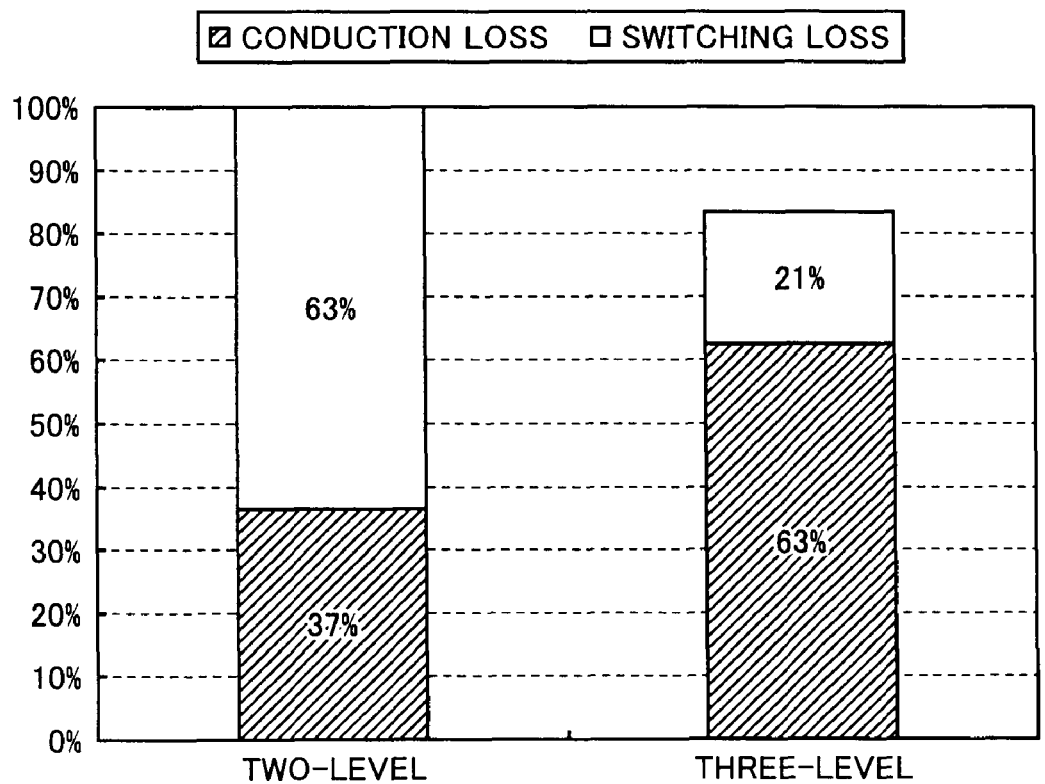
FIG. 18 is a diagram showing a result of simulation of loss in the two-level inverter and the three-level inverter.
FIG. 19 is a diagram illustrating a breakdown of the loss in the two-level inverter and the three-level inverter.

FIG. 18 is a diagram showing a result of simulation of loss in the two-level inverter and the three-level inverter. FIG. 19 is a diagram illustrating a breakdown of the loss in the two-level inverter and the three-level inverter. In this simulation, a DC input voltage was set to 600 V, a switching frequency was set to 10 kHz, an AC output voltage (line voltage) was set to 380 Vrms, and magnitude of a load was set to 275 kW. It is noted that the IGBT element included in the two-level inverter is a 1200V-600 A product and the IGBT element included in the three-level inverter is a 600V-600 A product.

Referring to FIGS. 18 and 19, the entire loss in the three-level inverter is equal to 83% of the entire loss in the two-level inverter, because switching loss is decreased. As shown in FIG. 18, the three-level inverter is smaller in switching loss than the two-level inverter (33%), because a voltage applied to a single semiconductor switching element can be lowered in the three-level inverter as compared with the two-level inverter.

As shown in FIG. 19, in the two-level inverter, switching loss occupies most (63%) of the entire loss. The three-level inverter can achieve significant decrease in the switching loss. Therefore, in the three-level inverter, though conduction loss increases as compared with the two-level inverter, the entire loss can be smaller than in the two-level inverter. By decreasing loss in the inverter, operation efficiency of the power conversion apparatus can be enhanced.

In the present embodiment, since converter 3 is also implemented by a three-level circuit, an effect the same as in inverter 4 can also be achieved by converter 3. Specifically, a reactor included in an input filter can be reduced in size. Thus, reduction in size and lighter weight of the power conversion apparatus can further be achieved. In addition, since fluctuation of a potential to ground can be suppressed, an amount of noise generated by converter 3 can also be lowered. Moreover, since loss in converter 3 can be decreased, operation efficiency of the power conversion apparatus can be enhanced. In addition to these effects, since common components can be used in converter 3 and inverter 4, cost for the power conversion apparatus can be reduced.

Figures 20, 21:
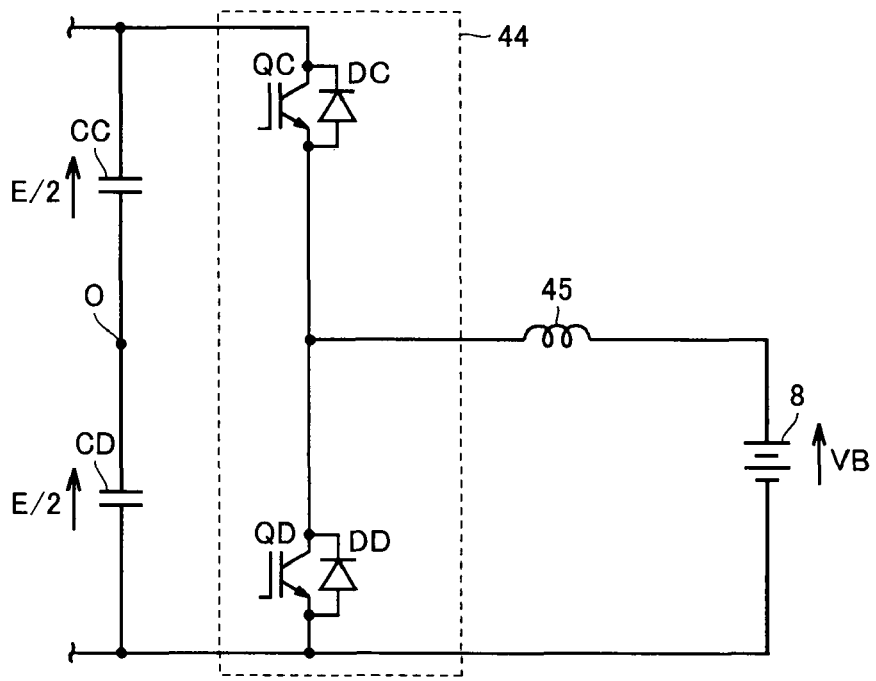
FIG. 20 is a diagram showing a configuration of a semiconductor switch included in a conventional DC voltage converter.
FIG. 21 is a diagram showing a switching pattern of IGBT elements Q1D to Q4D in FIG. 3 and a voltage applied to a reactor 22.

Further, DC voltage converter 7 has conventionally had such a configuration that two IGBT elements QC and QD are connected in series as shown in a semiconductor switch 44 in FIG. 20. As shown in FIG. 3, in the present embodiment, ripple components in a current that flows through reactor 22 are decreased by implementing a semiconductor switch by connecting four IGBT elements in series. In the case of the configuration in FIG. 20, when IGBT element QC is ON and IGBT element QD is OFF, a voltage of (E−VB) is applied to a reactor 45, and when IGBT element QC is OFF and IGBT element QD is ON, a voltage of (−VB) is applied to reactor 45. Therefore, a reactor voltage difference produced by switching is E. In contrast, in the configuration in FIG. 3, when only IGBT elements Q2D and Q3D are turned ON, a voltage of (−VB) is applied to reactor 22, and when only IGBT elements Q1D and Q4D are turned ON, a voltage of (E−VB) is applied to reactor 22. Other than these examples, there is an example where only IGBT elements Q1D and Q3D are turned ON or an example where only IGBT elements Q2D and Q4D are turned ON, and in such a case, a voltage of E/2−VB is applied to reactor 22.

FIG. 21 shows a switching pattern of IGBT elements Q1D to Q4D and a voltage applied to reactor 22. It can be seen from FIG. 21 that a voltage that can be applied to reactor 22 by DC voltage converter 7 also has three levels. According to the configuration in FIG. 3, the reactor voltage difference produced by switching can be set to E/2 and ripple components in a current that flows through reactor 22 can be decreased. Thus, inductance of reactor 22 can be decreased and reactor 22 can be reduced in size, and therefore reduction in size and lighter weight of the power conversion apparatus can further be achieved.

In addition, a configuration in which a plurality of capacitors are connected in series on the DC side of the inverter is not essential in the two-level inverter circuit. In the present embodiment, however, the inverter is implemented by the three-level circuit. Therefore, a plurality of capacitors must be connected in series between the positive terminal and the negative terminal on the DC side of the inverter. In addition, DC neutral point bus 17 must be connected from inverter 4 to the point of connection (neutral point 21) between capacitors 15 and 16.

In this case, since currents flowing through two capacitors 15 and 16 become different from each other depending on a current flowing into neutral point 21, DC voltages (Ep, En) of both capacitors can become imbalanced. When the DC voltages of both capacitors become imbalanced, an excess voltage may be applied to one capacitor, for example. Therefore, in the present embodiment, control (balance control) for suppressing potential fluctuation at the neutral point to equalize voltages Ep and En is performed.

Figure 22:
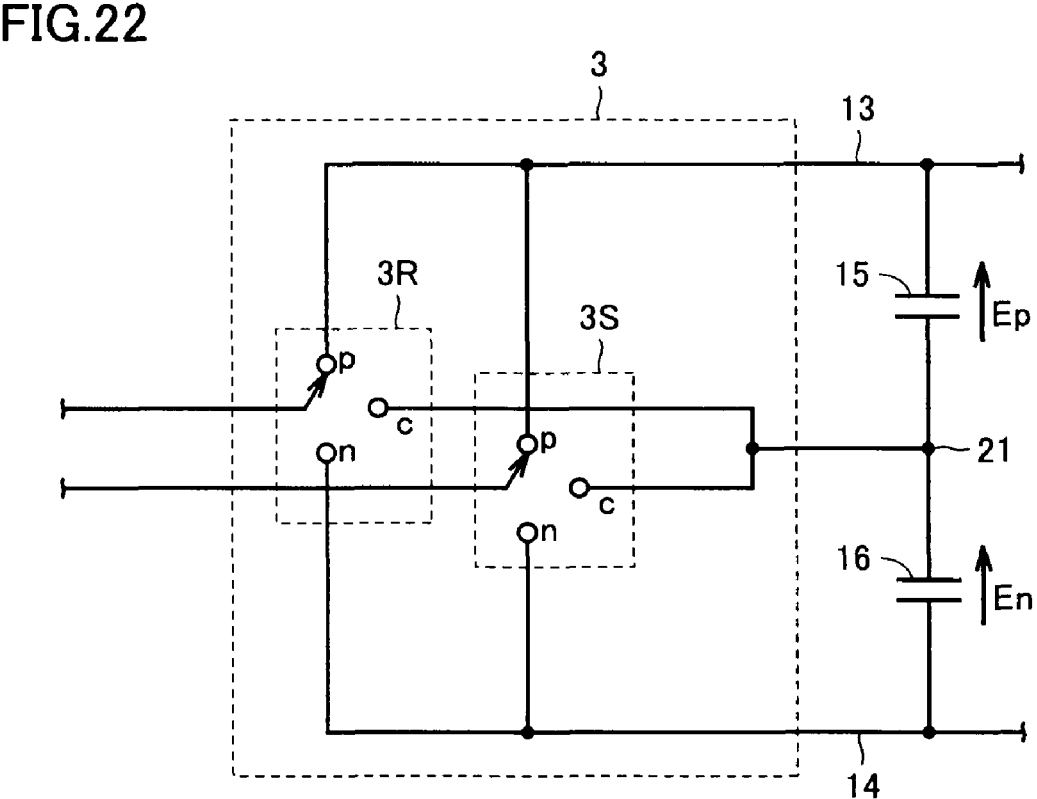
FIG. 22 is an equivalent circuit diagram showing a configuration of two phases of converter 3 shown in FIG. 2.

FIG. 22 is an equivalent circuit showing a configuration of two phases of converter 3 shown in FIG. 2. Referring to FIG. 22, R-phase arm 3R and S-phase arm 3S are each shown as a switch in the equivalent circuit. In this equivalent circuit, an AC output in the operation of the inverter has any one of three potential states (p, c, n), for example.

Figure 23:
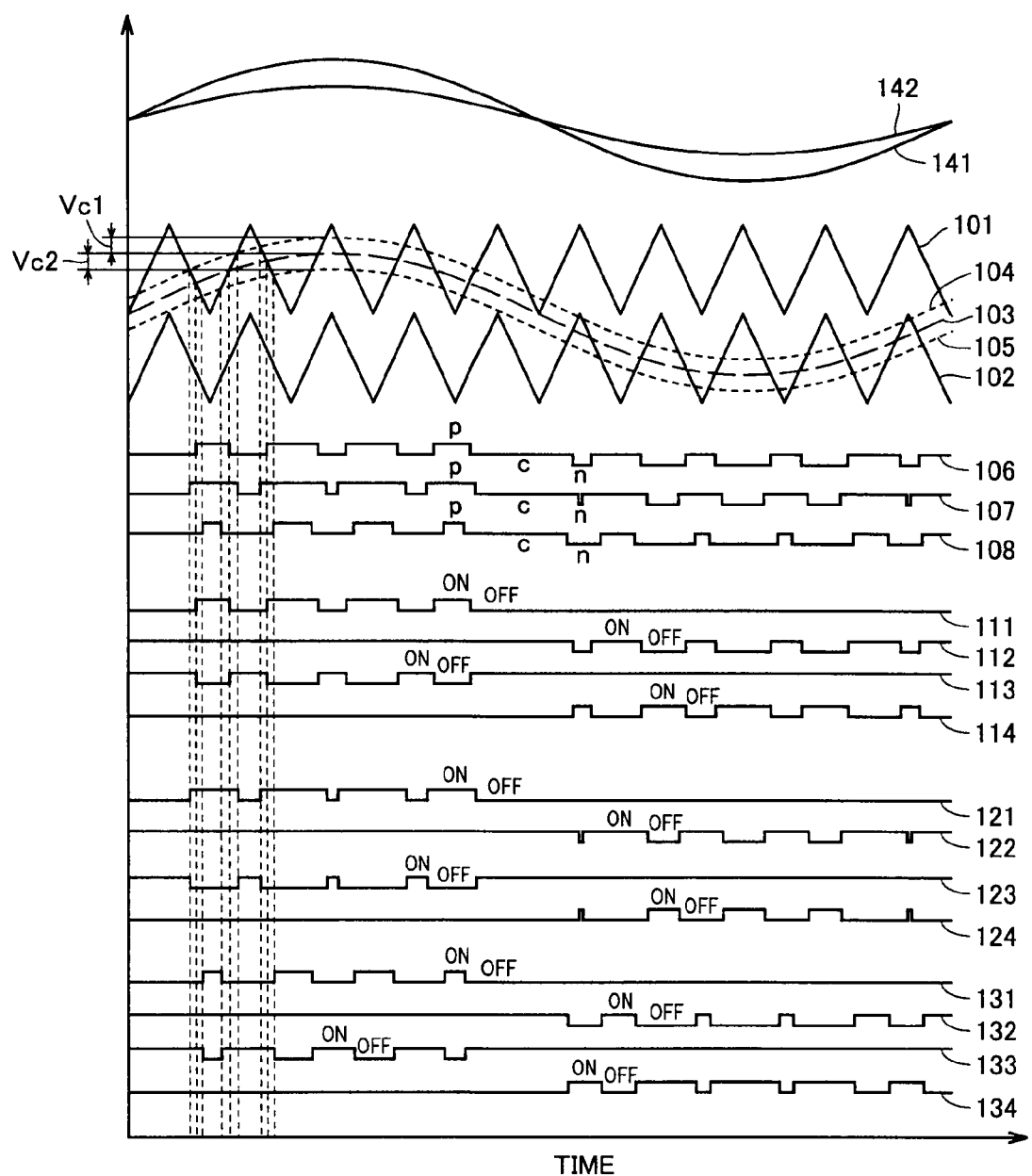
FIG. 23 is a signal waveform diagram for illustrating PWM control over one phase of converter 3 (three-level PWM converter) by a converter control unit 53 shown in FIG. 4.

FIG. 23 is a signal waveform diagram for illustrating PWM control over one phase of converter 3 (three-level PWM converter) by converter control unit 53 shown in FIG. 4. It is noted that the four IGBT elements included in the arm of each phase are denoted as reference characters Q1 to Q4 in the following description.

Referring to FIG. 23, since converter 3 operates with a power factor of 1.0, the polarity of an input phase voltage 141 matches the polarity of a phase current 142. A voltage instruction signal 103 is a voltage instruction signal that is not corrected by neutral point potential control circuit 62. By comparing in PWM circuit 65 whether voltage instruction signal 103 is higher or lower than reference signals 101 and 102, the switching pattern of the four IGBT elements included in the R phase (the same is also applied to the S phase and the T phase) is determined. Switching patterns 111 to 114 refer to the switching pattern of IGBT elements Q1 to Q4 of the phase arm in this case and a phase voltage 106 refers to the output voltage of converter 3.

A voltage instruction signal 104 is a voltage instruction signal corrected by neutral point potential control circuit 62 when Ep<En, and obtained by adding an adjustment signal Vc1 to voltage instruction signal 103. By comparing in PWM circuit 65 whether voltage instruction signal 104 is higher or lower than reference signals 101 and 102, the switching pattern of the four IGBT elements included in the R phase (the same is also applied to the S phase and the T phase) is determined. Switching patterns 121 to 124 refer to the switching pattern of IGBT elements Q1 to Q4 of the phase arm in this case and a phase voltage 107 refers to the output voltage of converter 3.

A voltage instruction signal 105 is a voltage instruction signal corrected by neutral point potential control circuit 62 when Ep>En, and obtained by adding an adjustment signal Vc2 to voltage instruction signal 103. By comparing in PWM circuit 65 whether voltage instruction signal 105 is higher or lower than reference signals 101 and 102, the switching pattern of the four IGBT elements included in the R phase (the same is also applied to the S phase and the T phase) is determined. Switching patterns 131 to 134 refer to the switching pattern of IGBT elements Q1 to Q4 of the phase arm in this case and a phase voltage 108 refers to the output voltage of converter 3.

It is noted that voltage instruction signal 103 corresponds to voltage instruction values ($VR_0^*$, $VS_0^*$, $VT_0^*$) from voltage instruction generation circuit 61, and adjustment signals Vc1 and Vc2 each corresponds to voltage instruction value $V_1^*$ from neutral point potential control circuit 62. Voltage instruction value $V_1^*$ is positive when Ep<En, and is negative when Ep>En.

Figure 25:
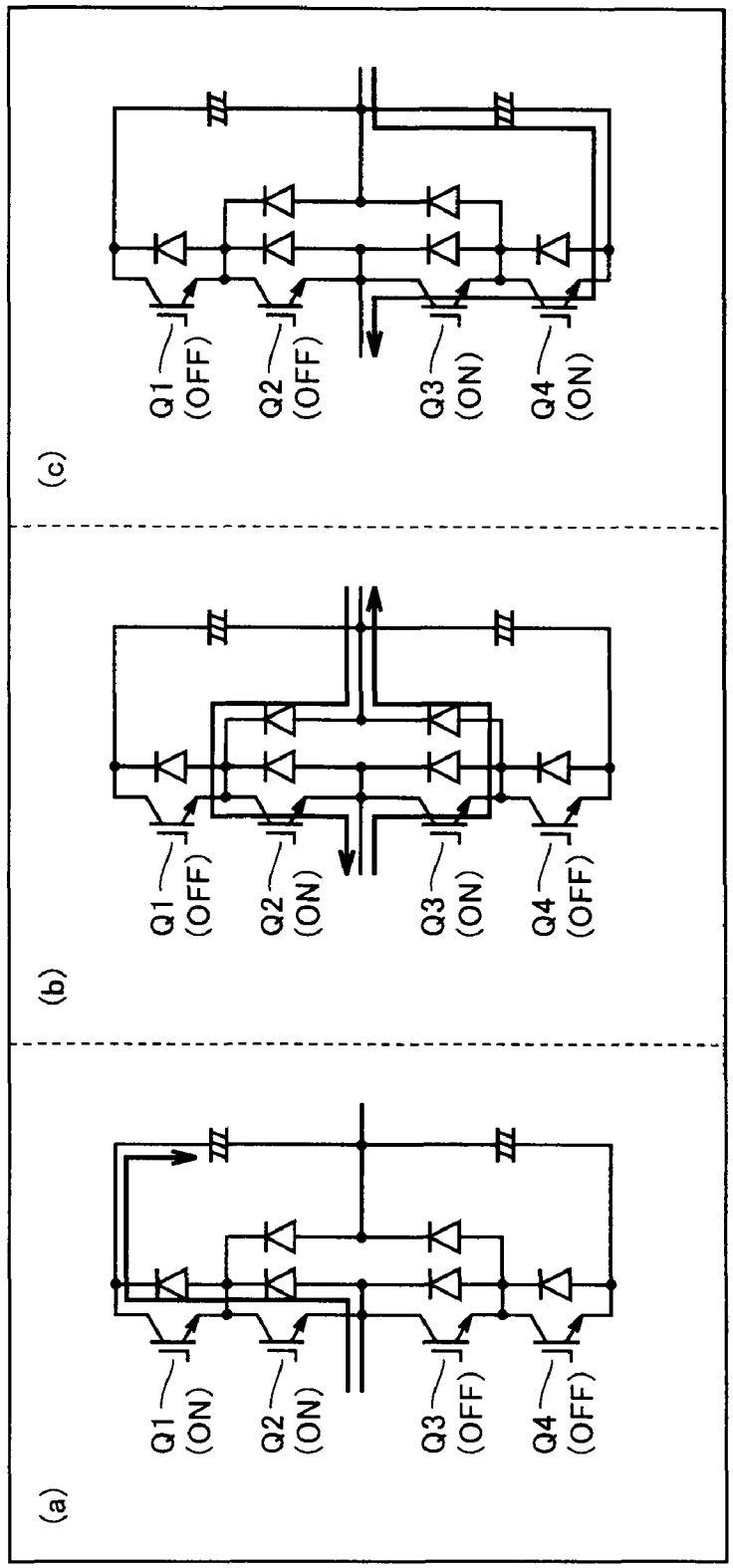
FIG. 25 is a diagram showing a circuit of one phase and a current route in the circuit in each mode shown in FIG. 24.

It can be seen from FIG. 23 that the switching pattern of the IGBT elements of the phase arm is configured by three modes. FIG. 24 shows the switching pattern of the four IGBT elements included in the R phase (the same is also applied to the S phase and the T phase), in each mode. FIG. 25 shows a circuit of one phase and a current route in the circuit in each mode shown in FIG. 24.

FIG. 25(a) shows a mode 1. In mode 1, smoothing capacitor 15 on the positive side is charged. FIG. 25(b) shows a mode 2. In mode 2, there is no great difference in the power storage state between smoothing capacitor 15 on the positive side and smoothing capacitor 16 on the negative side. FIG. 25(c) shows a mode 3. In mode 3, smoothing capacitor 16 on the negative side is charged.

Figure 26:
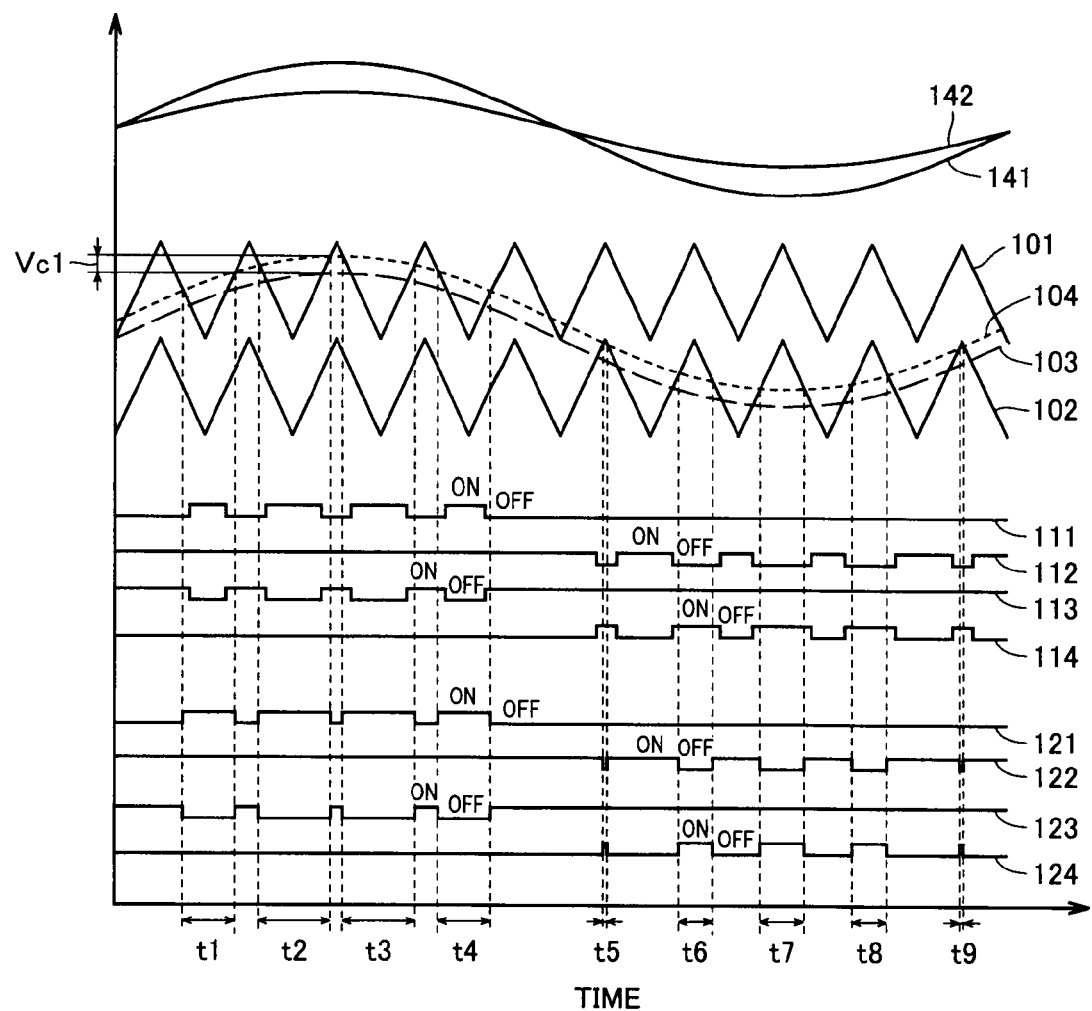
FIG. 26 is a signal waveform diagram for illustrating balance control by converter 3 when Ep<En.

FIG. 26 is a signal waveform diagram for illustrating balance control by converter 3 when Ep<En. Referring to FIG. 26, when Ep<En, neutral point potential control circuit 62 adds adjustment signal Vc1 to voltage instruction signal 103 and makes an adjustment such that the voltage instruction signal becomes voltage instruction signal 104, in order to achieve voltage balance between smoothing capacitors 15 and 16. By comparing in PWM circuit 65 whether voltage instruction signal 104 is higher or lower than reference signals 101 and 102, switching patterns 121 to 124 of IGBT elements Q1 to Q4 are obtained. During periods t1, t2, t3, and t4 over which input phase voltage 141 and phase current 142 are positive, smoothing capacitor 15 on the positive side is charged. During periods t5, t6, t7, t8, and t9 over which input phase voltage 141 and phase current 142 are negative, smoothing capacitor 16 on the negative side is charged. Comparing the switching patterns (111 to 114) without correction and the switching patterns (121 to 124) with correction, the charging period for smoothing capacitor 15 on the positive side is longer than the charging period for smoothing capacitor 16 on the negative side, and thus, voltage Ep can be more increased than voltage En. Since adjustment signal Vc1 is output to achieve Ep=En, the voltage of smoothing capacitor 15 matches the voltage of smoothing capacitor 16 and balance between both voltages is achieved.

Figure 27:
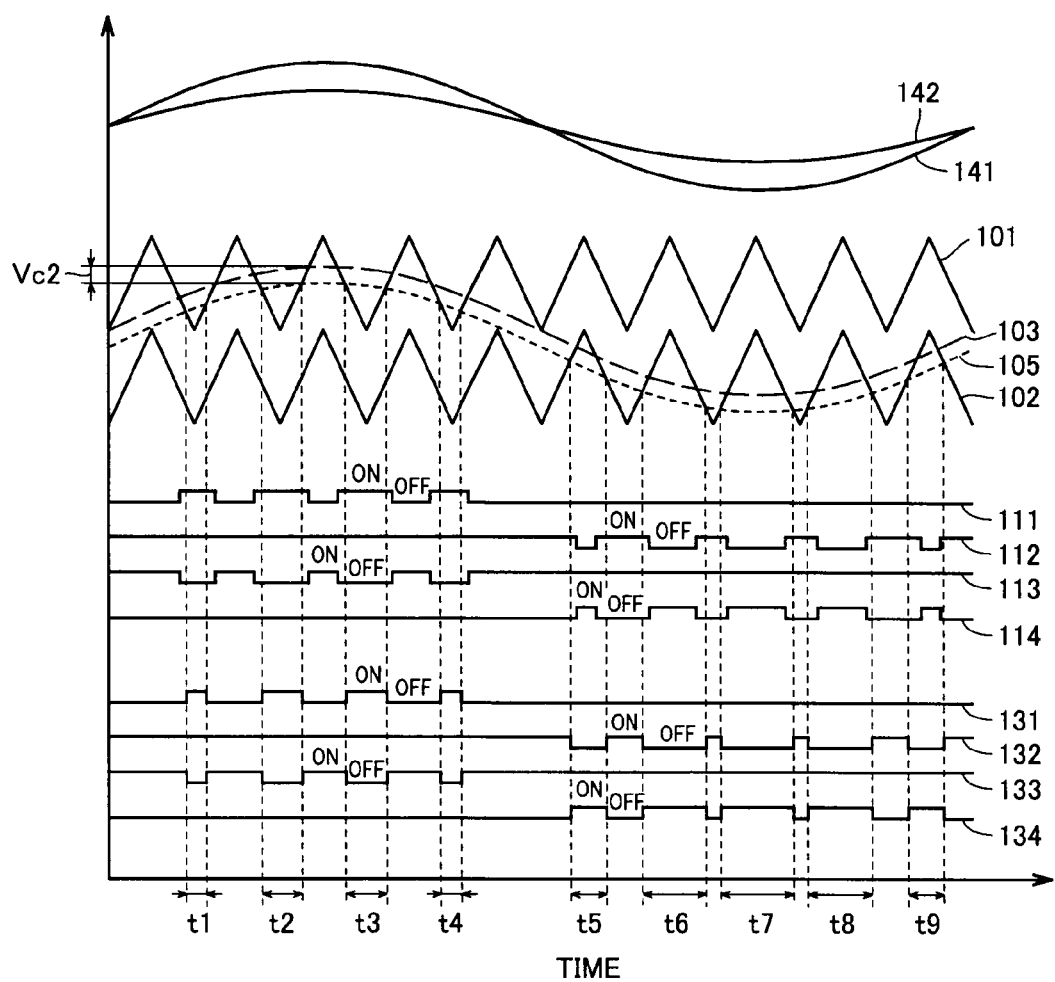
FIG. 27 is a signal waveform diagram for illustrating balance control by converter 3 when Ep>En.

FIG. 27 is a signal waveform diagram for illustrating balance control by converter 3 when Ep>En. Referring to FIG. 27, when Ep>En, neutral point potential control circuit 62 adds adjustment signal Vc2 to voltage instruction signal 103 and makes an adjustment such that the voltage instruction signal becomes voltage instruction signal 105, in order to achieve voltage balance between smoothing capacitors 15 and 16. By comparing in PWM circuit 65 whether voltage instruction signal 105 is higher or lower than reference signals 101 and 102, switching patterns 131 to 134 of IGBT elements Q1 to Q4 are obtained. During periods t1, t2, t3, and t4 over which input phase voltage 141 and phase current 142 are positive, smoothing capacitor 15 on the positive side is charged. During periods t5, t6, t7, t8, and t9 over which input phase voltage 141 and phase current 142 are negative, smoothing capacitor 16 on the negative side is charged. Comparing the switching patterns (111 to 114) without correction and the switching patterns (131 to 134) with correction, the charging period for smoothing capacitor 15 on the positive side is shorter than the charging period for smoothing capacitor 16 on the negative side, and thus, voltage En can be more increased than voltage Ep. Since adjustment signal Vc2 is output to achieve Ep=En, the voltage of smoothing capacitor 15 matches the voltage of smoothing capacitor 16 and balance between both voltages is achieved.

It is noted that since the same adjustment signal Vc1 or Vc2 is added to the voltage instruction signal in each phase, the line voltage output by the converter is not affected and voltage balance between the smoothing capacitors can be controlled. For example, when adjustment signal Vc1 is added to the voltage instruction signal, the corrected phase voltage as well as the line voltage before and after correction are expressed in accordance with the following expressions. It is noted that Vc1 in the following expressions represents the voltage of adjustment signal Vc1.

(1) corrected phase voltage:

$$Vu'=Vu+Vc1$$

$$Vv'=Vv+Vc1$$

$$Vw'=Vw+Vc1$$

(2) line voltage before correction:

$$Vuv=Vu-Vv$$

$$Vvw=Vv-Vw$$

$$Vwu=Vw-Vu$$

(3) line voltage after correction:

$$Vuv'=Vu'-Vv'=Vu+Vc1-Vv-Vc1=Vu-Vv=Vuv$$

$$Vvw'=Vv'-Vw'=Vv+Vc1-Vw-Vc1=Vv-Vw=Vvw$$

$$Vwu'=Vw'-Vu'=Vw+Vc1-Vu-Vc1=Vw-Vu=Vwu$$

Figure 28:
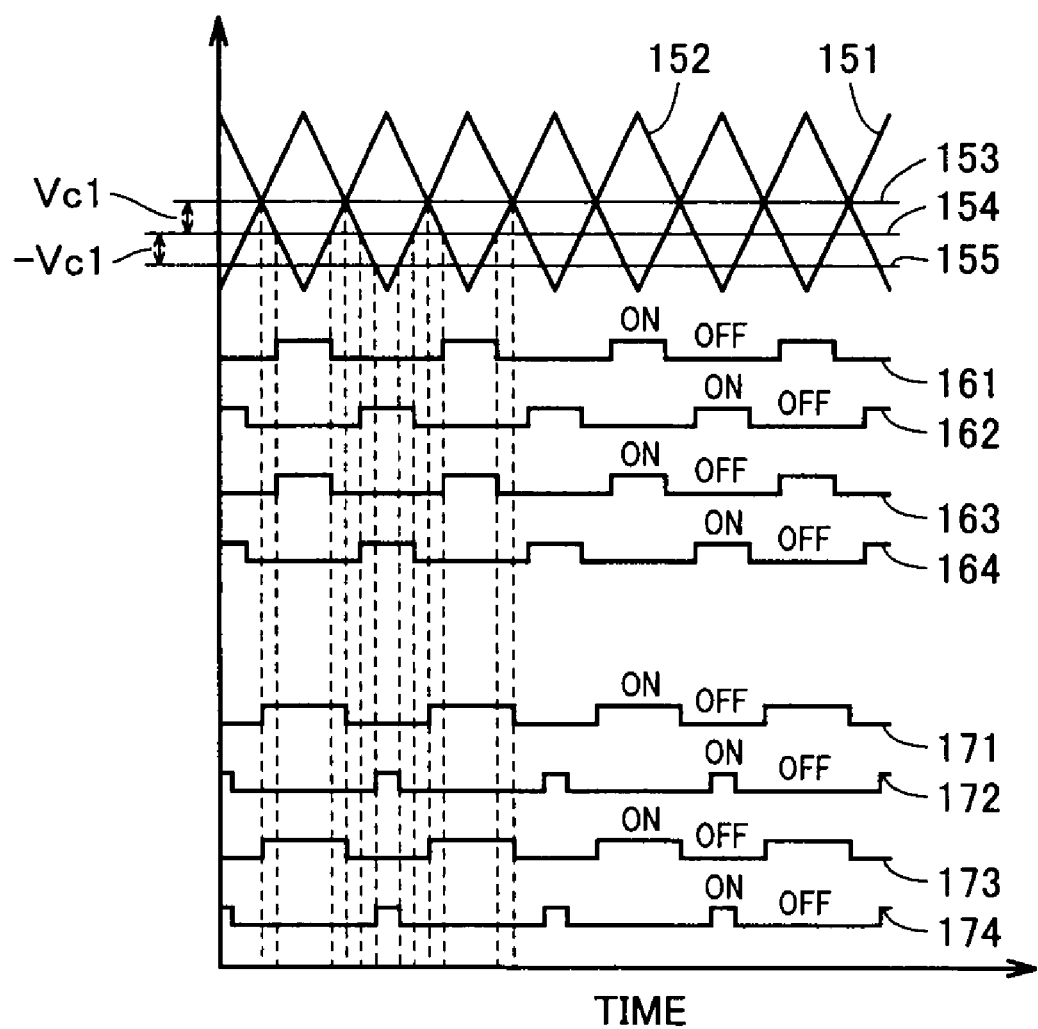
FIG. 28 is a signal waveform diagram for illustrating PWM control over a semiconductor switch 23 by a semiconductor switch control unit 54 shown in FIG. 4.

Next, potential control over the smoothing capacitor by semiconductor switch 23 and semiconductor switch control unit 54 will be described. FIG. 28 is a signal waveform diagram for illustrating PWM control over semiconductor switch 23 by semiconductor switch control unit 54 shown in FIG. 4. Referring to FIG. 28, a voltage instruction signal 154 is a voltage instruction signal that is not corrected by neutral point potential control circuit 72.

When Ep<En, the voltage instruction value (VB$_1$*) indicated by adjustment signal Vc1 is positive. In this case, neutral point potential control circuit 72 adds adjustment signal Vc1 to voltage instruction signal 154, and changes the voltage instruction signal for IGBT elements Q1D and Q3D to a voltage instruction signal 153. In addition, neutral point potential control circuit 72 subtracts adjustment signal Vc1 from instruction signal 154, and changes the voltage instruction signal for IGBT elements Q2D and Q4D to a corrected voltage instruction signal 155.

Figure 30:
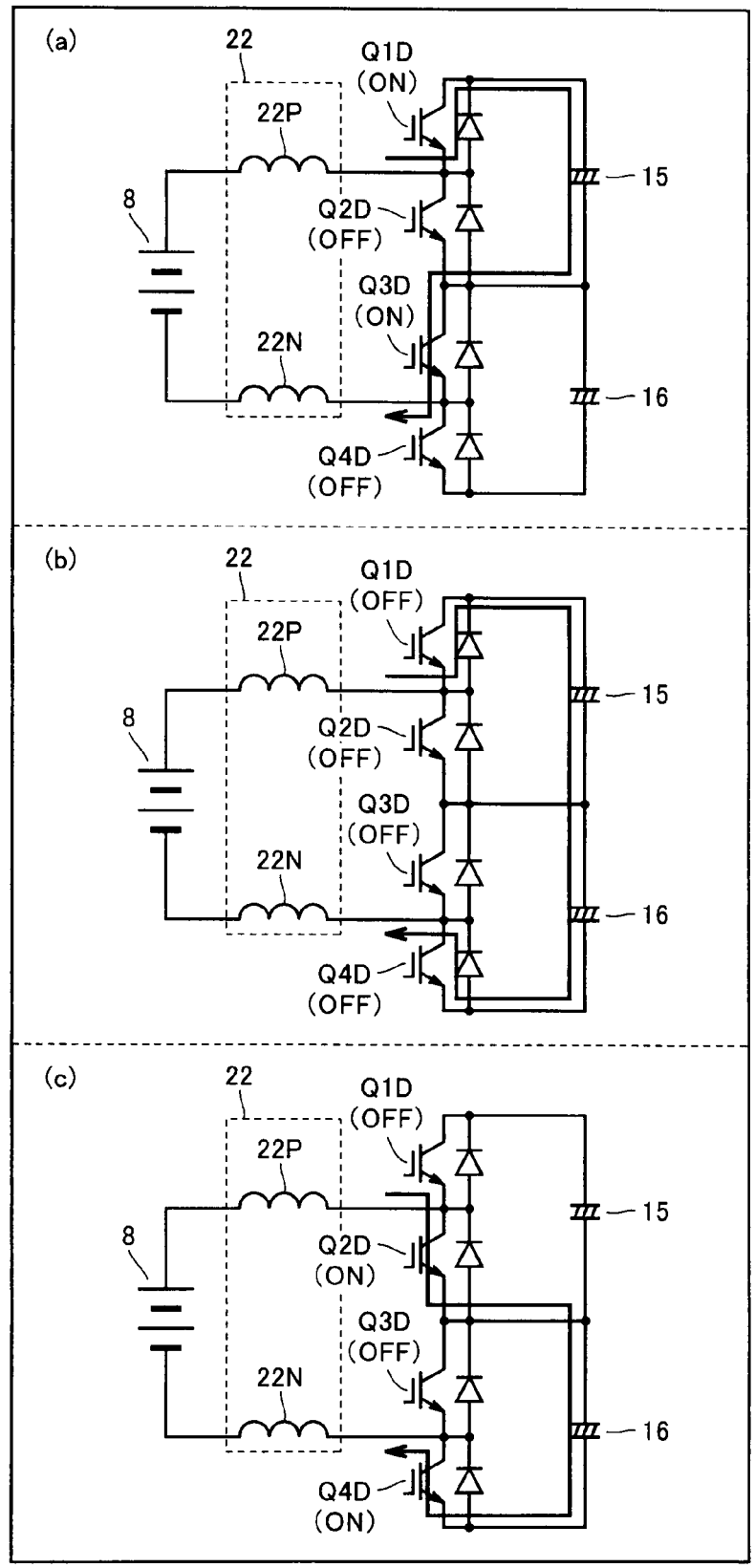
FIG. 30 is a diagram showing a circuit and a current route in the circuit in each mode shown in FIG. 29.

It can be seen from FIG. 28 that the switching pattern of four IGBT elements Q1D to Q4D included in semiconductor switch 23 is configured by three modes. FIG. 29 shows the switching pattern of IGBT elements Q1D to Q4D. FIG. 30 shows a circuit and a current route in the circuit in each mode shown in FIG. 29.

FIG. 30(a) shows a mode 1. In mode 1, smoothing capacitor 15 on the positive side is charged. FIG. 30(b) shows a mode 2. In mode 2, there is no great difference in the power storage state between smoothing capacitor 15 on the positive side and smoothing capacitor 16 on the negative side. FIG. 30(c) shows a mode 3. In mode 3, smoothing capacitor 16 on the negative side is charged.

Figure 31:
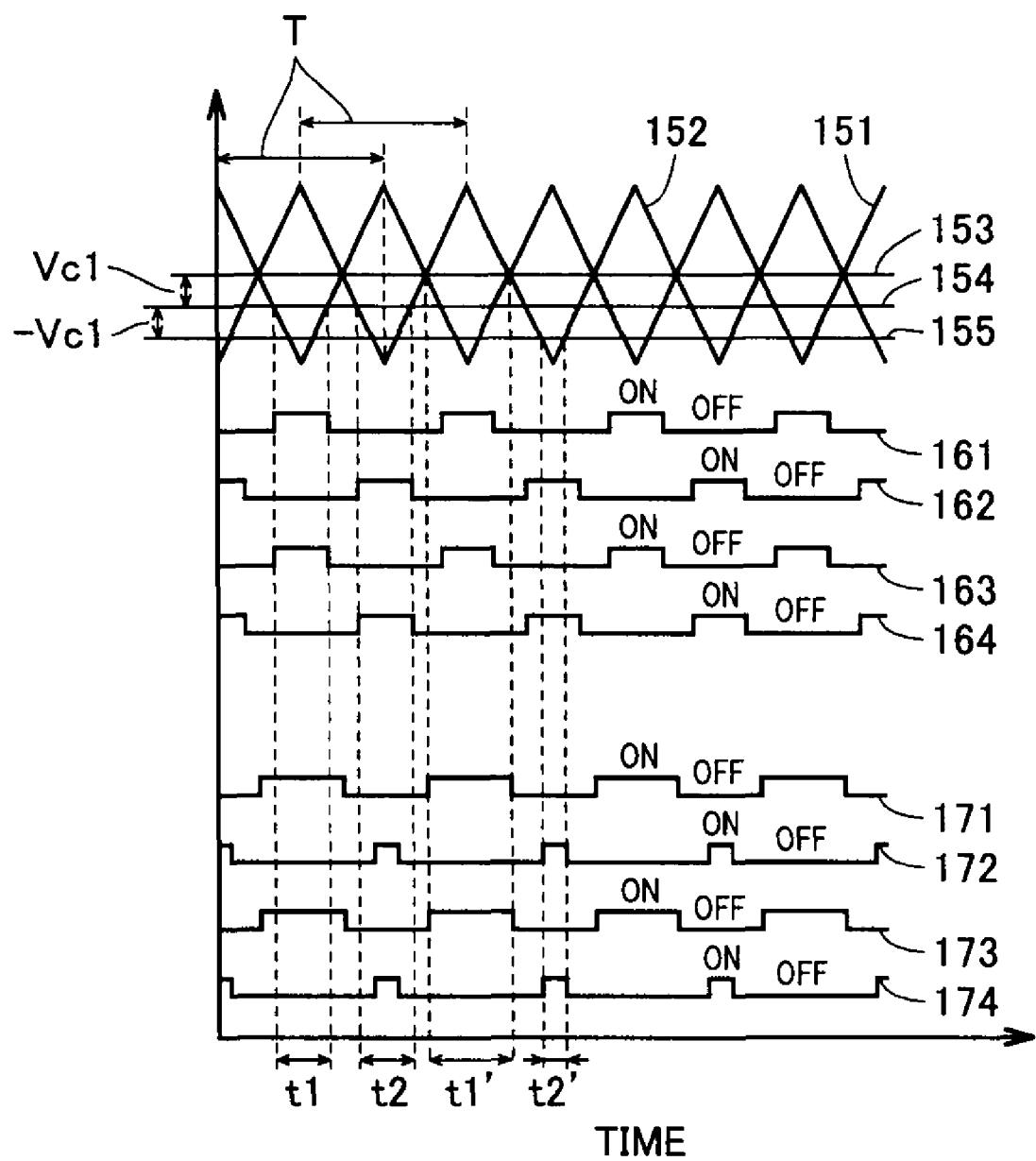
FIG. 31 is a signal waveform diagram for illustrating balance control by semiconductor switch 23 when Ep<En.

Returning to FIG. 28, by comparing in PWM circuit 75 whether voltage instruction signal 154 is higher or lower than a reference signal 151, switching patterns 161 and 163 of IGBT elements Q1 and Q3 are obtained. In addition, by comparing in PWM circuit 75 whether voltage instruction signal 154 is higher or lower than a reference signal 152, switching patterns 162 and 164 of IGBT elements Q2 and Q4 are obtained. As a result, as shown in FIG. 31, during period t1 in each cycle T of reference signal 151, IGBT elements Q1D to Q4D operate in mode 1 and smoothing capacitor 15 on the positive side is charged. In addition, during period t2 in each cycle T of reference signal 152, IGBT elements Q1D to Q4D operate in mode 3 and smoothing capacitor 16 on the negative side is charged.

When Ep<En, by comparing whether voltage instruction signal 153 is higher or lower than reference signal 151, switching patterns 171 and 173 of IGBT elements Q1D and Q3D are obtained. In addition, by comparing whether voltage instruction signal 155 is higher or lower than reference signal 152, switching patterns 172 and 174 of IGBT elements Q2D and Q4D are obtained. In this case, as shown in FIG. 31, during period t1' in each cycle T of reference signal 151, IGBT elements Q1D to Q4D operate in mode 1 and smoothing capacitor 15 on the positive side is charged. In addition, during period t2' in each cycle T of reference signal 152, IGBT elements Q1D to Q4D operate in mode 3 and smoothing capacitor 16 on the negative side is charged. Comparing the switching patterns (161 to 164) without correction and the switching patterns (171 to 174) with correction, the charging period (t1') for smoothing capacitor 15 on the positive side is longer than the charging period (t2') for smoothing capacitor 16 on the negative side, and thus, voltage Ep can be more increased than voltage En. Since adjustment signal Vc1 is output to achieve Ep=En, the voltage of smoothing capacitor 15 matches the voltage of smoothing capacitor 16 and balance between both voltages is achieved.

When Ep>En, the voltage instruction value (VB$_1$*) indicated by adjustment signal Vc1 is negative. In this case, neutral point potential control circuit 72 adds adjustment signal Vc1 to voltage instruction signal 154, and changes the voltage instruction signal for IGBT elements Q1D and Q3D to voltage instruction signal 155. In addition, neutral point potential control circuit 72 subtracts adjustment signal Vc1 from instruction signal 154, and changes the voltage instruction signal for IGBT elements Q2D and Q4D to corrected voltage instruction signal 153.

Figure 32:
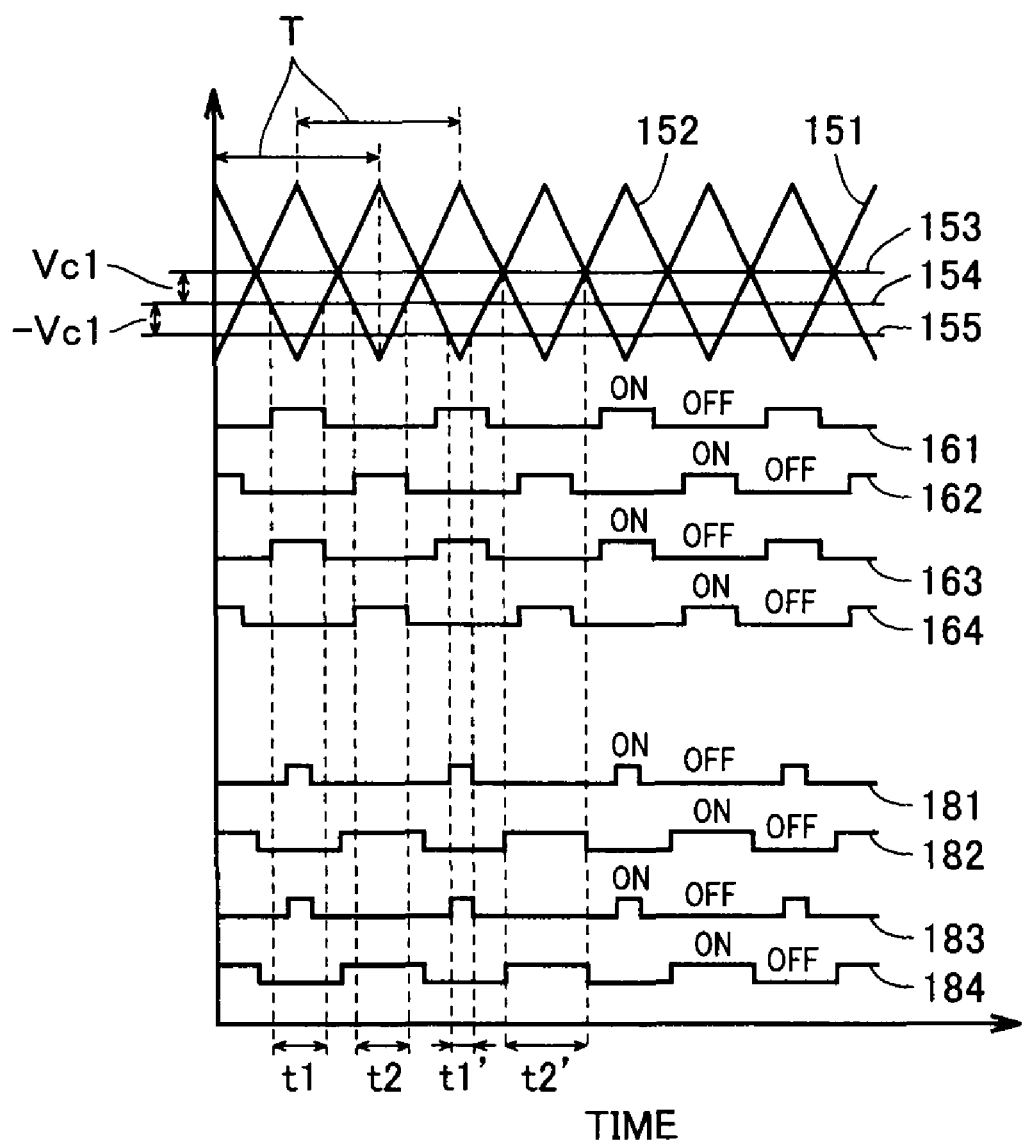
FIG. 32 is a signal waveform diagram for illustrating balance control by semiconductor switch 23 when Ep>En.

In this case, by comparing in PWM circuit 75 whether voltage instruction signal 155 is higher or lower than reference signal 151, switching patterns 181 and 183 shown in FIG. 32 are obtained as the switching pattern of IGBT elements Q1D and Q3D. In addition, by comparing in PWM circuit 75 whether voltage instruction signal 153 is higher or lower than reference signal 152, switching patterns 182 and 184 shown in FIG. 32 are obtained as the switching pattern of IGBT elements Q2D and Q4D.

When Ep>En, as shown in FIG. 32, during period t1' in each cycle T of reference signal 151, IGBT elements Q1D to Q4D operate in mode 1 and smoothing capacitor 15 on the positive side is charged. In addition, during period t2' in each cycle T of reference signal 152, IGBT elements Q1D to Q4D operate in mode 3 and smoothing capacitor 16 on the negative side is charged. Comparing the switching patterns (161 to 164) without correction and the switching patterns (181 to 184) with correction, the charging period (t1') for smoothing capacitor 15 on the positive side is shorter than the charging period (t2') for smoothing capacitor 16 on the negative side, and thus, voltage En can be more increased than voltage Ep. Since adjustment signal Vc1 is output to achieve Ep=En, the voltage of smoothing capacitor 15 matches the voltage of smoothing capacitor 16 and balance between both voltages is achieved.

It is noted that as shown in the following expressions, the duty ratios of mode 1 and mode 3 vary in accordance with adjustment signal Vc1, while the duty ratio of the period obtained by adding mode 1 and mode 3 does not vary. In the present embodiment, since the same adjustment signal Vc1 is added to one of the two voltage instruction signals and is subtracted from the other, the boost operation of DC voltage converter 7 is not affected and voltage balance between smoothing capacitors 15 and 16 can be controlled.

(1) duty ratio for voltage instruction signal 154
duty ratio d13 of IGBT elements Q1D and Q3D:

$$d13=t1/T$$

duty ratio d24 of IGBT elements Q2D and Q4D:

$$d24=t2/T$$

duty ratio d14 of IGBT elements Q1 to Q4:

$$d14=d13+d24=(t1+t2)/T$$

(2) duty ratio for voltage instruction signals 153 and 155
duty ratio d13' of IGBT elements Q1 and Q3:

$$d13'=t1'/T$$

duty ratio d24' of IGBT elements Q2 and Q4:

$$d24'=t2'/T$$

duty ratio d14' of IGBT elements Q1 to Q4:

$$d14'=d13'+d24'=(t1'+t2')/T=(t1+t2)/T=d14$$

As described above, in the present embodiment, converter 3 and semiconductor switch 23 included in DC voltage converter 7 are each implemented by the three-level circuit. Therefore, converter 3 can perform balance control when the commercial AC power supply is normal, and DC voltage converter 7 (semiconductor switch 23) can perform balance control at the time of power failure of the commercial AC power supply. Therefore, according to the present embodiment, balance control over the DC capacitor (smoothing capacitor) can be performed without adding a special circuit.

It is noted that the DC voltage converter may perform the operation of converting the DC voltage output from the converter during operation of the converter to a charging voltage of the storage battery. As a result, the storage battery can be maintained in the fully-charged state, and thus, the time period during which the storage battery can drive the load in the case of power failure of the commercial AC power supply can be lengthened.

In addition, the present invention is not limited to such a configuration that any one of the DC voltage converter and the converter supplies DC power to the inverter. Both of the DC voltage converter and the converter may supply DC power to the inverter.

In addition, in the present embodiment, a three-level circuit has been shown, however, a circuit implementing an inverter, a converter or a DC voltage converter should only be a circuit (a multi-level circuit) that performs conversion between a DC voltage and an AC voltage or a DC voltage having at least three voltage values. Therefore, a five-level circuit for performing conversion between a DC voltage and an AC voltage having at least five voltage values is applicable to an inverter or the like.

Figure 33:
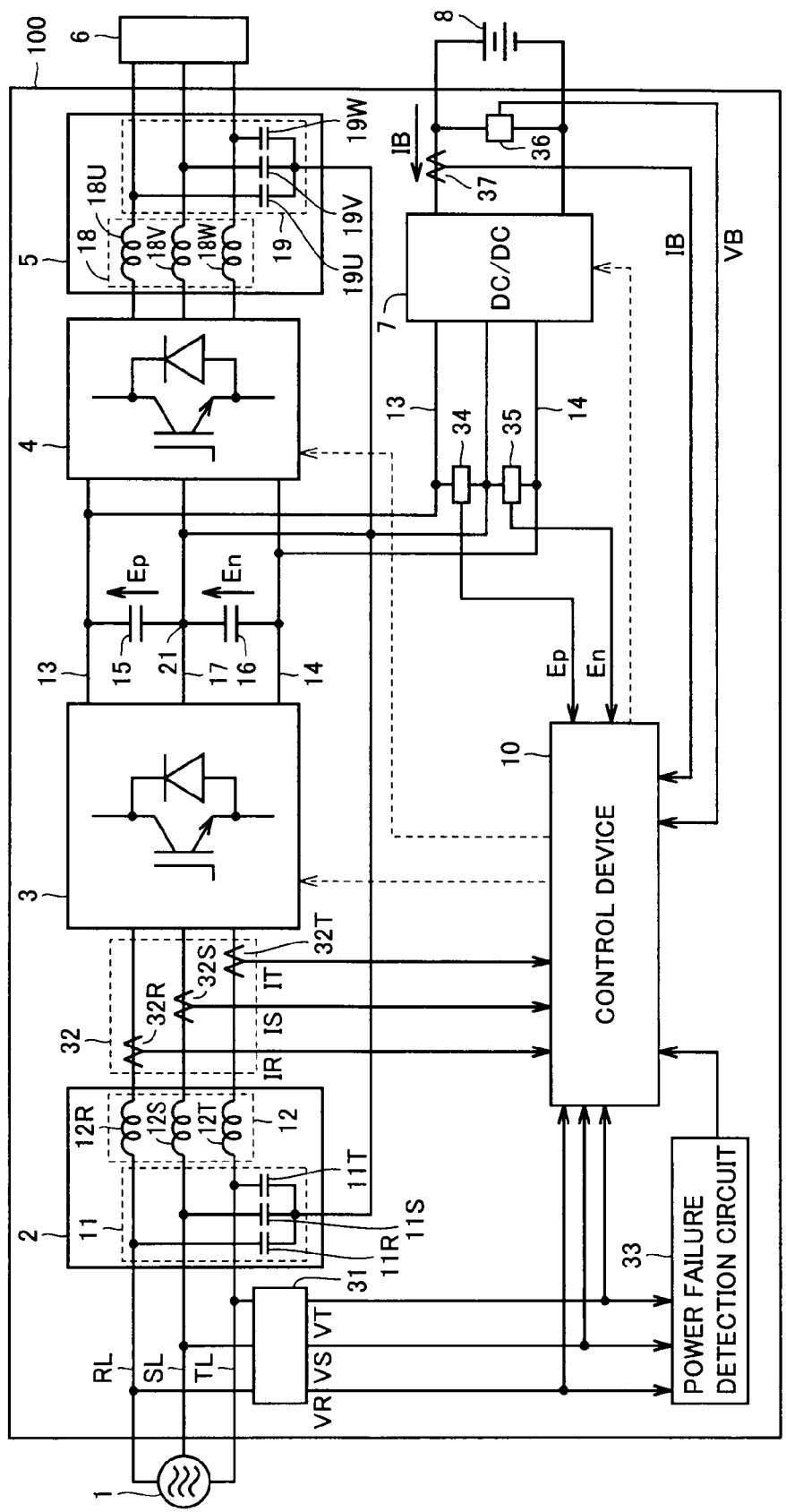
FIG. 33 is a diagram showing a state that a power conversion apparatus according to the present invention is applied to a three-phase, four-wire system.

In addition, in the present embodiment, an uninterruptible power supply system applicable to a three-phase, three-wire system AC power supply and load has been shown, however, the present invention is also applicable to a three-phase, four-wire system AC power supply and load. In the case of the three-phase, four-wire system, as shown in FIG. 33, it is only necessary to connect neutral points of respective capacitors 11 and 19 to neutral point 21. Further, the AC power supply and the AC load are not limited to those of three phases, and a single-phase power supply or load may be adopted. In that case, two multi-level circuits should only be included in each of a converter and an inverter.

Moreover, in the present embodiment, an example where the power conversion apparatus according to the present invention is applied to the uninterruptible power supply system including the storage battery has been described, however, a filter achieving smaller size and lighter weight that includes a multi-level circuit as well as achieving suppression of fluctuation of a potential to ground is applicable to a power conversion apparatus outputting AC power based on DC power, such as a solar power generation system, a fuel cell power generation system, or a secondary battery energy storage system.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power conversion apparatus, comprising:
   first and second capacitors connected in series between a DC positive bus and a DC negative bus;
   a first conversion device including a first multi-level circuit configured to be able to perform conversion between a DC voltage and an AC voltage varying among at least three voltage values and connected to said DC positive bus, said DC negative bus and a neutral point between said first and second capacitors, for converting DC power to AC power for supply to a load;
   a second conversion device including a second multi-level circuit identical in configuration to said first multi-level circuit and connected to said DC positive bus, said DC negative bus and said neutral point in parallel to the first multi-level circuit, for converting AC power from an AC power supply to DC power for supply to said first conversion device;

a DC power supply source for supplying DC power to said first conversion device;

a filter including a reactor and a capacitor, for removing a harmonic generated by said first conversion device; and a control device for controlling an operation of said second multi-level circuit to suppress potential fluctuation at said neutral point.

2. The power conversion apparatus according to claim 1, wherein said control device controls a corresponding multi-level circuit such that a charging period for said first capacitor and a charging period for said second capacitor change, based on a difference between a voltage across opposing ends of said first capacitor and a voltage across opposing ends of said second capacitor, to suppress said potential fluctuation at said neutral point.

3. The power conversion apparatus according to claim 1, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

4. The power conversion apparatus according to claim 2, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

5. A power conversion apparatus, comprising:

first and second capacitors connected in series between a DC positive bus and a DC negative bus;

a first conversion device including a first multi-level circuit configured to be able to perform conversion between a DC voltage and an AC voltage varying among at least three voltage values and connected to said DC positive bus, said DC negative bus and a neutral point between said first and second capacitors, for converting DC power to AC power for supply to a load;

a second conversion device including a second multi-level circuit identical in configuration to said first multi-level circuit and connected to said DC positive bus, said DC negative bus and said neutral point in parallel to the first multi-level circuit, for converting AC power from an AC power supply to DC power for supply to said first conversion device;

a third conversion device including a third multi-level circuit configured to be able to perform conversion between a DC voltage and a DC voltage varying among at least three voltage values and connected to said DC positive bus, said DC negative bus and said neutral point in parallel to said first and second multi-level circuits, for converting a voltage value of DC power from a DC power supply source and supplying the DC power from said DC power supply source to said first conversion device;

a filter including a reactor and a capacitor, for removing a harmonic generated by said first conversion device; and a control device for controlling an operation of said third multi-level circuit to suppress potential fluctuation at said neutral point.

6. The power conversion apparatus according to claim 5, wherein said control device controls a corresponding multi-level circuit such that a charging period for said first capacitor and a charging period for said second capacitor change, based on a difference between a voltage across opposing ends of said first capacitor and a voltage across opposing ends of said second capacitor, to suppress said potential fluctuation at said neutral point.

7. The power conversion apparatus according to claim 5, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

8. The power conversion apparatus according to claim 6, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

9. A power conversion apparatus, comprising:

first and second capacitors connected in series between a DC positive bus and a DC negative bus;

a first conversion device including a first multi-level circuit configured to be able to perform conversion between a DC voltage and an AC voltage varying among at least three voltage values and connected to said DC positive bus, said DC negative bus and a neutral point between said first and second capacitors, for converting DC power to AC power for supply to a load;

a second conversion device including a second multi-level circuit identical in configuration to said first multi-level circuit and connected to said DC positive bus, said DC negative bus and said neutral point in parallel to the first multi-level circuit, for converting AC power from an AC power supply to DC power for supply to said first conversion device;

a third conversion device including a third multi-level circuit configured to be able to perform conversion between a DC voltage and a DC voltage varying among at least three voltage values and connected to said DC positive bus, said DC negative bus and said neutral point in parallel to said first and second multi-level circuits, for converting a voltage value of DC power from a DC power supply source and supplying the DC power from said DC power supply source to said first conversion device;

a filter including a reactor and a capacitor, for removing a harmonic generated by said first conversion device; and a control device for controlling operations of said second and third multi-level circuits to suppress potential fluctuation at said neutral point.

10. The power conversion apparatus according to claim 9, wherein said control device controls a corresponding multi-level circuit such that a charging period for said first capacitor and a charging period for said second capacitor change, based on a difference between a voltage across opposing ends of said first capacitor and a voltage across opposing ends of said second capacitor, to suppress said potential fluctuation at said neutral point.

11. The power conversion apparatus according to claim 9, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

12. The power conversion apparatus according to claim 10, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

13. The power conversion apparatus according to claim 9, wherein said control device operates said second multi-level circuit and stops said third multi-level circuit when power supply by said AC power supply is normal, and said control device stops said second multi-level circuit and operates said third multi-level circuit when said power supply by said AC power supply is abnormal.

14. The power conversion apparatus according to claim 13, wherein said control device controls a corresponding multi-level circuit such that a charging period for said first capacitor and a charging period for said second capacitor change, based on a difference between a voltage across opposing ends of said first capacitor and a voltage across opposing ends of said second capacitor, to suppress said potential fluctuation at said neutral point.

15. The power conversion apparatus according to claim 13, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

16. The power conversion apparatus according to claim 14, wherein said first multi-level circuit includes:

first to fourth semiconductor switching elements connected in series between said DC positive bus and said DC negative bus, first to fourth free-wheeling diodes connected in anti-parallel to said first to fourth semiconductor switching elements, respectively, a first clamp diode connected between said neutral point and a point of connection between said first and second semiconductor switching elements, and a second clamp diode connected between said neutral point and a point of connection between said third and fourth semiconductor switching elements.

\* \* \* \* \*